(12) United States Patent
Nakamiya

(10) Patent No.: US 8,170,198 B2
(45) Date of Patent: May 1, 2012

(54) TONE SIGNAL DETECTOR, TONE SIGNAL DETECTION METHOD, AND COMPUTER READABLE RECORDING MEDIUM

(75) Inventor: Yuuki Nakamiya, Osaka (JP)

(73) Assignee: Icom Incorporated (JP)

( * ) Notice: Subject to any disclaimer, the term of this patent is extended or adjusted under 35 U.S.C. 154(b) by 385 days.

(21) Appl. No.: 12/419,035

(22) Filed: Apr. 6, 2009

(65) Prior Publication Data

US 2009/0262924 A1 Oct. 22, 2009

(30) Foreign Application Priority Data

Apr. 22, 2008 (JP) .................................. 2008-111910
Apr. 22, 2008 (JP) .................................. 2008-111916

(51) Int. Cl.
*H04M 1/00* (2006.01)
*H04M 3/00* (2006.01)
(52) U.S. Cl. ........................................ 379/386; 379/283
(58) Field of Classification Search .................. 379/283, 379/386

See application file for complete search history.

(56) References Cited

U.S. PATENT DOCUMENTS 6,172,974 B1 * 1/2001 Tseng et al. ................... 370/357
2005/0195967 A1 * 9/2005 Pessoa et al. ................. 379/283

FOREIGN PATENT DOCUMENTS

JP 11-163748 6/1999

* cited by examiner

*Primary Examiner* — Alexander Jamal
(74) *Attorney, Agent, or Firm* — Baker & McKenzie LLP

(57) ABSTRACT

Upon selection of the frequency of a tone signal, a local oscillator generates a frequency signal having a shift frequency corresponding to the frequency of this tone signal. A frequency shifter generates a frequency-converted signal by shifting a frequency of the tone signal by a shift frequency of the frequency signal generated by the local oscillator. A BPF removes an image signal from the frequency-converted signal which the frequency shifter generated, and a normalizer normalizes the amplitude of the signal output from the second BPF. By this, even if the amplitude of the tone signal is small, the amplitude thereof is unified to a suitable magnitude. For this reason, even if there is a difference in the amplitude of the tone signal, the tone signal can be detected reliably and an false detection can be prevented.

14 Claims, 19 Drawing Sheets

| ft | SHIFT AMOUNT | fb |
|---|---|---|
| ft1 | Δf1 | |
| ft2 | Δf2 | fts1 |
| ⋮ | ⋮ | |

TIME

TIME

TIME

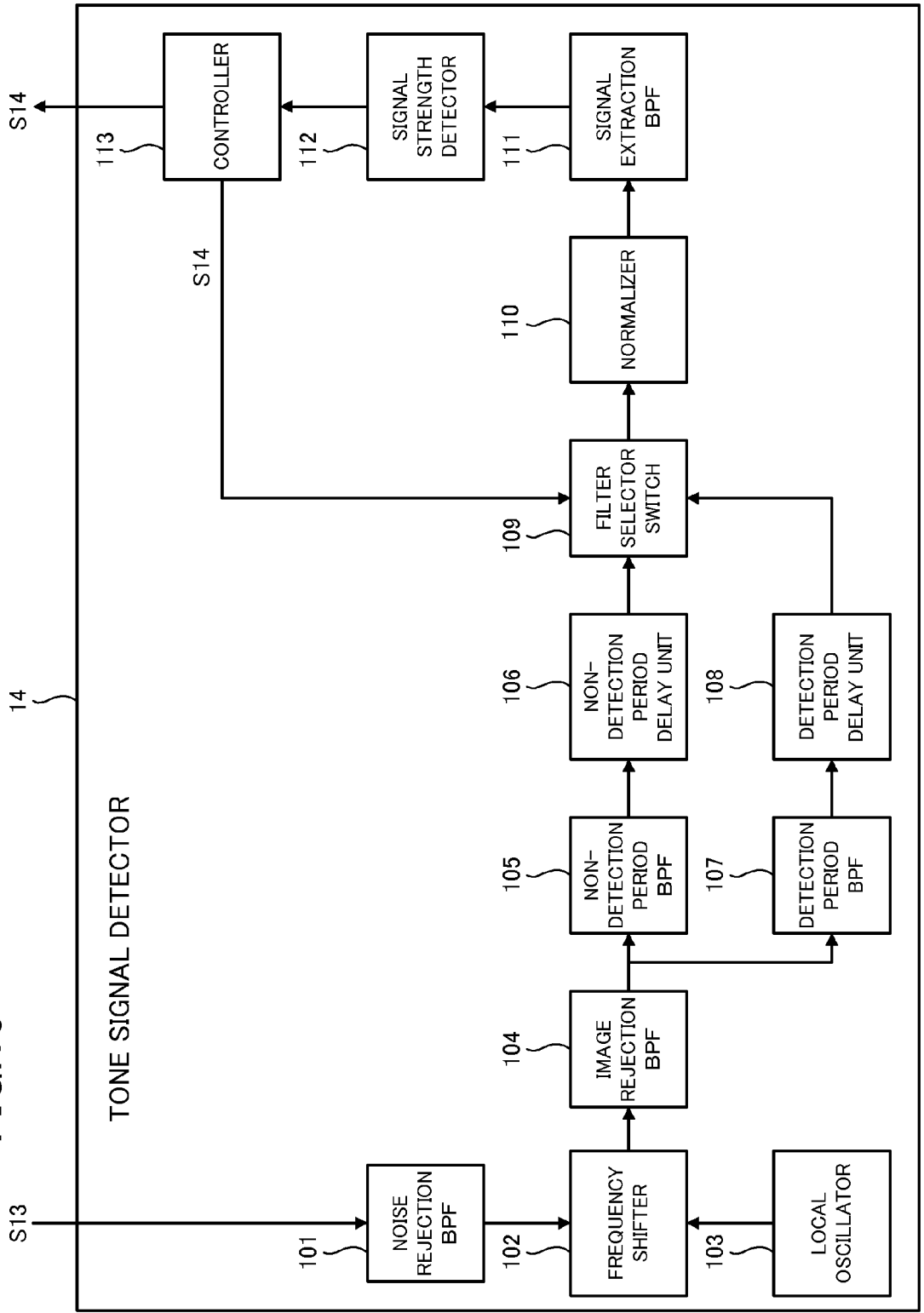

TONE SIGNAL DETECTOR, TONE SIGNAL DETECTION METHOD, AND COMPUTER READABLE RECORDING MEDIUM

RELATED APPLICATIONS

This application is based on Japanese Patent Application No. 2008-111910 filed on Apr. 22, 2008, and Japanese Patent Application No. 2008-111916 filed on Apr. 22, 2008, and including specification, claims, drawings and summary. The disclosure of the above Japanese Patent Applications are incorporated herein by reference in its entirety.

BACKGROUND OF THE INVENTION

1. Field of the Invention

The present invention relates to a tone signal detector, a tone signal detection method, and a computer readable recording medium.

2. Description of the Related Art

In communication using an FM (Frequency Modulation) method or the like, as the technique for determining whether or not a call is established between a transmitter and a receiver, a technique using a tone signal is known.

Specifically, the transmitter superimposes a continuous tone signal of a single frequency on a modulated signal in advance and sends the resultant signal, and the receiver extracts the frequency component of the tone signal from the demodulated signal using a bandpass filter and then determines whether or not a call is established depending on whether or not the intensity of frequency component exceeds a predetermined value.

The receiver, when determining that a call has not been established yet, prevents noise from being output from a loudspeaker, for example, by turning off a relay prepared on a path from a demodulator to the loudspeaker.

Conventionally, various techniques of this kind for preventing an false detection of a tone signal have been disclosed.

For example, Japanese Utility Model Application KOKAI Publication No. S63-97928 (pp. 3-4, FIG. 1) discloses a tone squelch circuit, wherein the frequency of a tone signal is converted into a certain frequency and the converted signal is selected by means of a bandpass filter so that the tone signal of each frequency may be detected.

Moreover, Unexamined Japanese Patent Application KOKAI Publication No. H11-163748 proposes a technique for solving a problem that a receiver falsely detects noise as a tone signal, when the noise having a frequency component of the same frequency as that of the tone signal is superimposed on a modulated signal.

A tone signal detection circuit disclosed in Unexamined Japanese Patent Application KOKAI Publication No. H11-163748 comprises: a first filter that extracts the frequency component of the frequency of the tone signal and extracts the frequency component in the vicinity of the frequency of the tone signal; a second filter that attenuates the frequency component of the frequency of the tone signal and extracts the frequency component in the vicinity of the frequency of the tone signal; and a subtractor.

Specifically, the first filter outputs the frequency component of the tone signal and the frequency component of noise, while the second filter outputs only the frequency component of the noise. The subtractor acquires and outputs only the frequency component of the tone signal by subtracting the frequency component which the second filter outputs from the frequency component which the first filter outputs.

However, with the techniques disclosed in both Patent Documents described above, the tone signal might be falsely detected or might not be detected when there is a difference in the amplitude of the tone signal at each frequency due to the communication conditions, such as a difference in the output of a transmitter or the radio wave environment.

Moreover, there is a strong desire to switch the configurations, criteria, or the like for detecting the tone signal depending on the situations and thereby prevent the false detection of the tone signal. However, the techniques disclosed in both Patent Documents described above do not employ a configuration for switching the configurations, criteria, or the like for detecting the tone signal depending on the situations.

SUMMARY OF THE INVENTION

The present invention has been made in view of such conventional problems. It is a first object of the present invention to provide a tone signal detector, a tone signal detection method, and a computer readable recording medium capable of preventing an false detection of a tone signal even if there is a difference in the amplitude of the tone signal at each frequency.

Moreover, it is a second object of the present invention to provide a tone signal detector, a tone signal detection method, and a computer readable recording medium that prevent an false detection of a tone signal by switching the configurations, criteria, or the like for detecting the tone signal depending on the situations.

In order to achieve the first object described above, a tone signal detector according to the present invention comprises:

a frequency-signal generator that generates a frequency signal for shifting the frequency of a tone signal to a predetermined frequency band;

a frequency converter that generates a frequency-converted signal by shifting the frequency of an input signal containing the tone signal by the frequency of the frequency signal generated by the frequency-signal generator;

a normalizer that generates a normalized signal by normalizing the amplitude of the frequency-converted signal generated by the frequency converter;

a filter whose pass band is set in the frequency band of the tone signal contained in the normalized signal generated by the normalizer, the filter filtering the normalized signal; and a tone signal detection unit that detects the tone signal based on the signal filtered by the filter.

Moreover, in order to achieve the first object described above, a tone signal detection method according to the present invention comprises the steps of:

generating a frequency signal for shifting the frequency of a tone signal to a predetermined frequency band;

generating a frequency-converted signal by shifting the frequency of an input signal containing the tone signal by the frequency of the generated frequency signal;

generating a normalized signal by normalizing the amplitude of the generated frequency-converted signal;

filtering the normalized signal by means of a filter whose pass band is set to a frequency band of the tone signal contained in the generated normalized signal; and detecting the tone signal based on the signal filtered by the filter.

Moreover, in order to achieve the first object described above, a computer readable recording medium according to the present invention records a program for causing a computer to execute procedures for:

generating a frequency signal for shifting a frequency of a tone signal to a predetermined frequency band;

generating a frequency-converted signal by shifting a frequency of an input signal containing the tone signal by a frequency of the generated frequency signal;

generating a normalized signal by normalizing an amplitude of the generated frequency-converted signal;

filtering the normalized signal by means of a filter whose pass band is set to a frequency band of the tone signal contained in the generated normalized signal; and detecting the tone signal based on the signal filtered by the filter.

The normalizer may, based on the amplitude of the frequency-converted signal generated by the frequency converter, determine a reference value indicative of the intensity of the frequency-converted signal and then normalize the amplitude of the frequency-converted signal by dividing the frequency-converted signal by the reference value.

Alternatively, the normalizer may normalize the amplitude of the frequency-converted signal by binarizing the amplitude of the frequency-converted signal generated by the frequency converter.

The tone signal detector may further comprise a down sampler that down-samples the frequency-converted signal generated by the frequency converter, wherein the normalizer may normalize the amplitude of the frequency-converted signal down-sampled by the down sampler, and wherein a pass band of the filter may be a frequency band of the tone signal contained in the normalized signal.

Moreover, in order to achieve the second object described above, a tone signal detector according to the present invention is the tone signal detector for detecting a tone signal of a predetermined frequency contained in an input signal, the tone signal detector comprising:

a signal non-detection period filter;

a signal detection period filter having a gain characteristic different from that of the signal non-detection period filter;

an extractor extracting a frequency component of a frequency corresponding to a relevant tone signal from a supplied signal;

a discriminator that determines whether or not a signal strength of a signal extracted by the extractor exceeds a predetermined value, outputs a non-detection signal when determining that the signal strength of the relevant signal does not exceed a predetermined value, and outputs a detection signal when determining that the signal strength of the relevant signal exceeds the predetermined value; and a supply unit which, while the non-detection signal is output by the discriminator, supplies to the extractor a signal obtained by an input signal passing through the signal non-detection period filter and which, while the detection signal is output by the discriminator, supplies to the extractor a signal obtained by the input signal passing through the signal detection period filter.

Moreover, in order to achieve the second object described above, a tone signal detection method according to the present invention is the tone signal detection method executed by a tone signal detector which includes: a signal non-detection period filter; a signal detection period filter having a gain characteristic different from that of the signal non-detection period filter; an extractor; a discriminator; and a supply unit, the method comprising the steps of, the extractor extracting a frequency component of a frequency corresponding to a relevant tone signal from a supplied signal;

the discriminator determining whether or not a signal strength of the signal extracted by the extractor exceeds a predetermined value, outputting a non-detection signal when determining that the signal strength of the relevant signal does not exceed a predetermined value, and outputting a detection signal when determining that the signal strength of the relevant signal exceeds the predetermined value, and the supply unit supplying to the extractor a signal obtained by an input signal passing through the signal non-detection period filter while a non-detection signal is output by the discriminator, and supplying to the extractor a signal obtained by the input signal passing through the signal detection period filter while a detection signal is output by the discriminator.

Moreover, in order to achieve the second object described above, a computer readable recording medium according to the present invention records a program for causing a computer to function as:

a signal non-detection period filter;

a signal detection period filter having a gain characteristic different from that of the signal non-detection period filter;

an extractor extracting a frequency component of a frequency corresponding to a relevant tone signal from a supplied signal;

a discriminator determining whether or not a signal strength of a signal extracted by the extractor exceeds a predetermined value, outputting a non-detection signal when determining that the signal strength of the relevant signal does not exceed a predetermined value, and outputting a detection signal when determining that the signal strength of the relevant signal exceeds a predetermined value; and a supply unit supplying to the extractor a signal obtained by an input signal passing through the signal non-detection period filter while the non-detection signal is output by the discriminator, and supplying to the extractor a signal obtained by the input signal passing through the signal detection period filter while the detection signal is output by the discriminator.

The signal non-detection period filter may have peaks of gain at a frequency higher and at a frequency lower than a frequency of the tone signal, and the signal detection period filter may have a peak of gain at substantially the same frequency as that of the relevant tone signal.

In this case, the signal non-detection period filter preferably includes a combination of a first bandpass filter having a peak of gain at a frequency higher than that of the tone signal and a second bandpass filter having a peak of gain at a frequency lower than that of the tone signal.

The extractor may include a normalizer that normalizes the signal level of a supplied signal, and the extractor may normalize the supplied signal by means of the normalizer and then extract a frequency component corresponding to the frequency of the relevant tone signal from the normalized signal.

In this case, the normalizer may normalize the signal level of a supplied signal by binarization using a predetermined threshold.

Alternatively, the normalizer may determine a reference value indicative of the intensity of a relevant signal based on the signal level of a supplied signal, and then normalize the signal level of the supplied signal by dividing the signal level of the supplied signal by the reference value.

The supply unit may further include a delay unit that makes a delay time of a signal passing through the signal non-detection period filter substantially identical to that of a signal passing through the signal detection period filter.

BRIEF DESCRIPTION OF THE DRAWINGS

These objects and other objects and advantages of the present invention will become more apparent upon reading of the following detailed description and the accompanying drawings in which:

FIG. 15 is a block diagram showing the configuration of a tone signal detector according to Embodiment 3 of the present invention;

DETAILED DESCRIPTION OF THE PREFERRED EMBODIMENTS

Hereinafter, a tone signal detector according to the embodiments of the present invention will be described with reference to the accompanying drawings. Note that, in each of the embodiments below, a case where the tone signal detector is applied to a receiver will be described.

Embodiment 1

Figure 1:
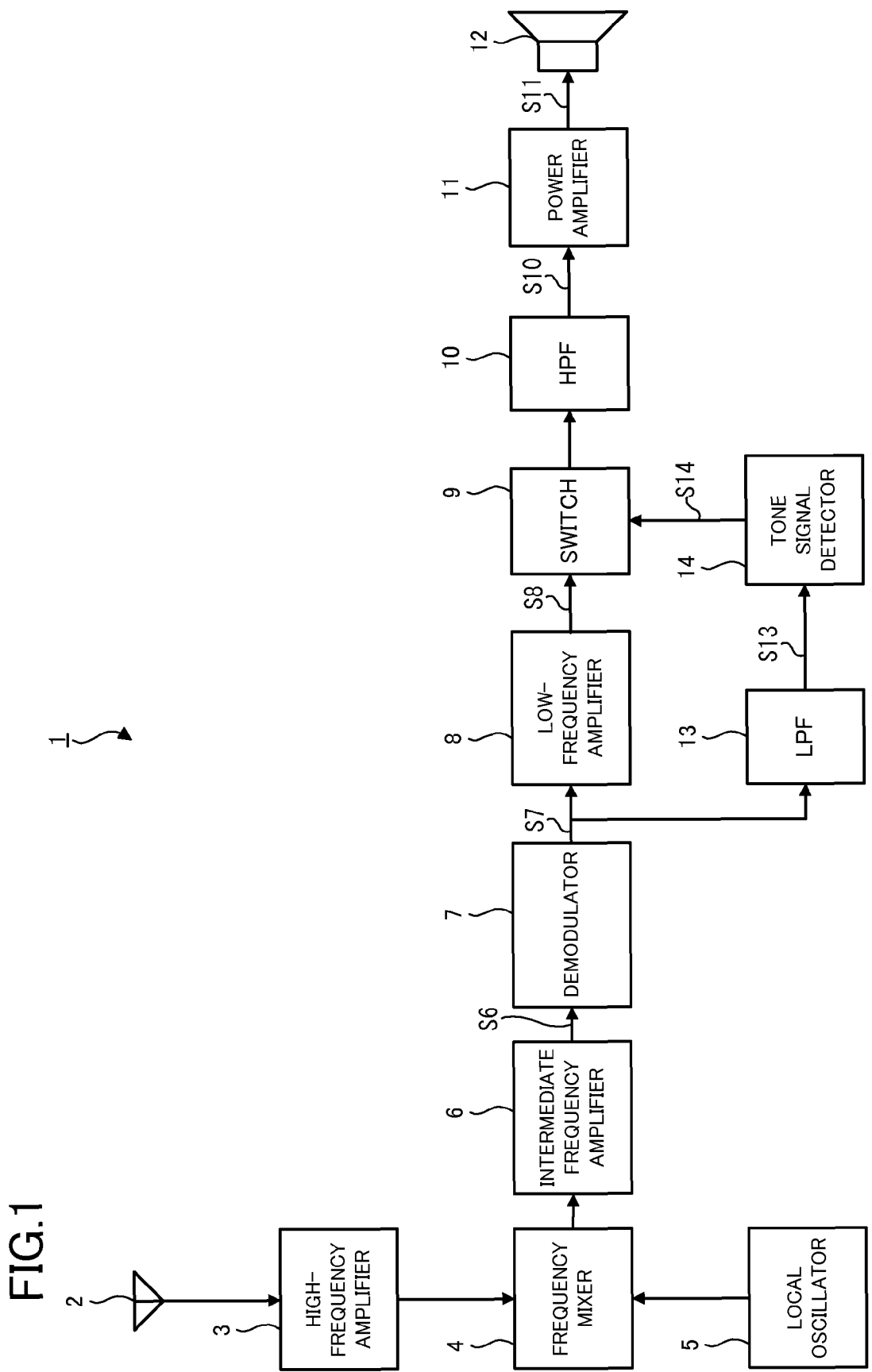
FIG. 1 is a block diagram showing a configuration of a receiver according to Embodiment 1 of the present invention.

The configuration of a receiver 1 according to Embodiment 1 is shown in FIG. 1.

The receiver 1 comprises an antenna 2, a high-frequency amplifier 3, a frequency mixer 4, a local oscillator 5, an intermediate frequency amplifier 6, a demodulator 7, a low-frequency amplifier 8, a switch 9, an HPF (High Pass Filter) 10, a power amplifier 11, a loudspeaker 12, an LPF (Low Pass Filter) 13, and a tone signal detector 14.

The antenna 2 captures a carrier (hereinafter, refers to as a "received signal") that carries a signal containing a tone signal St.

The high-frequency amplifier 3 amplifies the received signal that is captured from the antenna 2. The high-frequency amplifier 3 is constructed using, for example, a high electron mobility transistor with low noise performance.

The frequency mixer 4 mixes the received signal supplied from the high-frequency amplifier 3 with a local oscillation signal supplied from the local oscillator 5, thereby generating a received signal (intermediate frequency signal) whose frequency has been shifted.

The local oscillator 5 generates the local oscillation signal. Note that the frequency of the local oscillation signal is set to a frequency obtained by subtracting the frequency of the intermediate frequency signal from the frequency of the received signal, or to a frequency obtained by adding the frequency of the intermediate frequency signal to the frequency of the received signal. The local oscillator 5 includes, for example, a well-known oscillator circuit provided with a crystal oscillator.

The intermediate frequency amplifier 6 amplifies the intermediate frequency signal supplied from the frequency mixer 4, and supplies a resultant signal S6 to the demodulator 7.

The demodulator 7 generates a low frequency signal S7 by demodulating the signal S6 supplied from the intermediate frequency amplifier 6.

The low-frequency amplifier 8 amplifies the low frequency signal S7 generated by the demodulator 7, to generate a signal S8. The low-frequency amplifier 8 includes a well-known class A amplifier or a class B push-pull amplifier, for example.

The switch 9 supplies the signal S8 supplied from the low-frequency amplifier 8 to the loudspeaker 12 in accordance with a control signal S14 supplied from the tone signal detector 14. The switch 9 supplies the signal S8, which is supplied from the low-frequency amplifier 8, to the HPF 10 (squelch is opened) while a detection signal indicative of detection of the tone signal St is supplied from the tone signal detector 14. On the other hand, the switch 9 shuts off the supply of the signal S8, which is supplied from the low-frequency amplifier 8, to the HPF 10 (squelch is closed) while a non-detection signal indicative of non-detection of the tone signal St is supplied from the tone signal detector 14.

The HPF 10 passes therethrough a frequency component higher than a predetermined frequency among frequency components of the signal S8 supplied from the low-frequency amplifier 8 via the switch 9, and attenuates a frequency component lower than the predetermined frequency. That is, the HPF 10 attenuates the frequency component of a relatively low frequency, the frequency component constituting the tone signal St, among the frequency components of the signal S8, and supplies only the frequency component of a relatively high frequency, the frequency component constituting a sound signal, to the power amplifier 11.

The power amplifier 11 power-amplifies the signal S10 supplied from the HPF 10, and supplies a resultant signal S11 to the loudspeaker 12. The power amplifier 11 includes a well-known class A amplifier or a class B push-pull amplifier, for example.

The loudspeaker 12 outputs a sound based on the signal S11 supplied from the power amplifier 11.

The LPF 13 passes therethrough a frequency component lower than the predetermined frequency among the frequency components of the demodulation signal (low frequency signal S7) supplied from the demodulator 7, and attenuates the frequency component higher than the predetermined frequency. In order for the tone signal detector 14 to detect the tone signal, only the frequency component (frequency component of a relatively low frequency) within a range of frequencies which the tone signal may have is required. In other words, the frequency component (frequency component of a relatively high frequency) of the voice band is not required.

However, the low frequency signal S7 supplied from the demodulator 7 also contains the frequency component of a relatively high frequency constituting the sound signal in addition to the frequency component of a relatively low frequency constituting the tone signal St. Moreover, the strength of the sound signal is substantially stronger than the strength of the tone signal St. For this reason, the LPF 13 sufficiently attenuates the frequency component of the voice band among the frequency components of the low frequency signal S7, and supplies a resultant signal S13 to the tone signal detector 14.

The tone signal detector 14 detects the tone signal St contained in the signal S13 supplied from the LPF 13. The tone signal detector 14 generates a control signal S14 based on the detection result of and supplies the generated control signal S14 to the switch 9.

Moreover, in order to prevent an false detection of the tone signal St, the tone signal detector 14 is configured so as to normalize the amplitude of a frequency-converted signal that is obtained by converting the tone frequency of the tone signal St.

Figure 2:
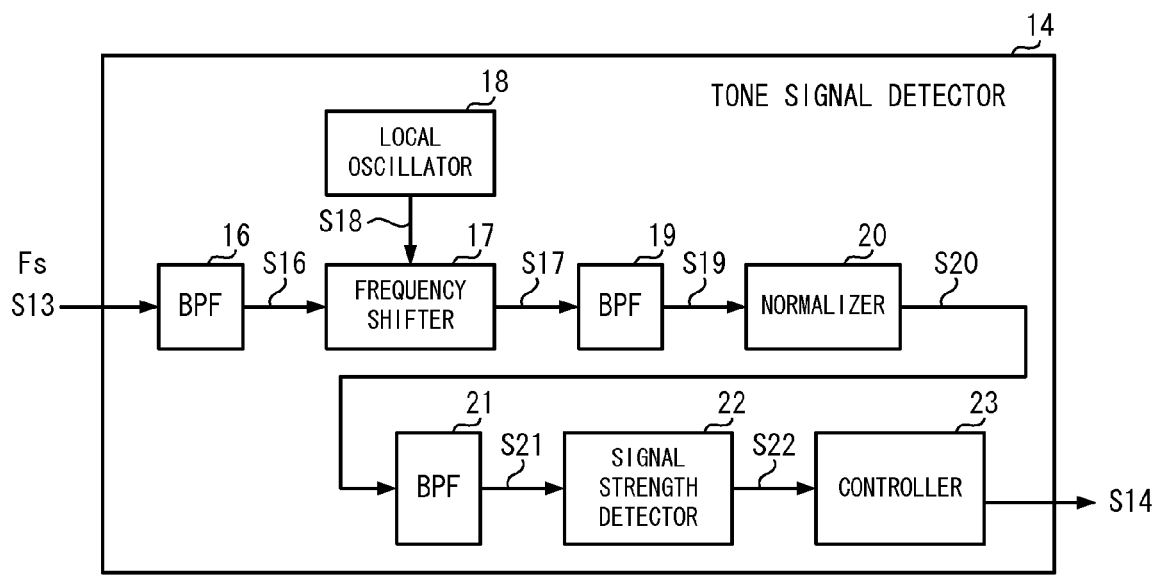
FIG. 2 is a block diagram showing a configuration of a tone signal detector shown in FIG. 1.

The tone signal detector 14 includes a BPF 16, a frequency shifter 17, a local oscillator 18, a BPF 19, a normalizer 20, a BPF 21, a signal strength detector 22, and a controller 23, as shown in FIG. 2.

The BPF 16 is a bandpass filter with a pass band of the tone frequency of the tone signal St, and further attenuates the voice band component remaining in the signal S13 by band-limiting the signal S13 supplied from the LPF 13. The BPF 16 supplies a signal S16 obtained as a result of such filtering to the frequency shifter 17.

The frequency shifter 17 shifts the frequency of the signal S16 as the input signal containing the tone signal St by the shift frequency of a frequency signal S18 supplied from the local oscillator 18, thereby generating the frequency-converted signal S17.

The frequency shifter 17 shifts the frequency of the signal S16 by multiplying the signal S16 with the frequency signal S18 or by adding the signal S16 to the frequency signal S18, and then outputting the resultant signal via a nonlinear element. In Embodiment 1, the frequency shifter 17 includes a multiplier (not shown), as a unit that multiplies the signal S16 by the frequency signal S18.

In multiplying the signal S16 with the frequency signal S118, the frequency-converted signal S17 which the frequency shifter 17 outputs is expressed by Equation (1) below.

$$s12 = \sin\{(2\pi ft)t\} \times \sin\{(2\pi \Delta f)t\] \quad \text{(Equation 1)}$$
$$= \frac{1}{2}[-\cos\{2\pi(ft + \Delta f)t\} + \cos\{2\pi(ft - \Delta f)t\}]$$

Where ft; the tone frequency of the tone signal St (the frequency of the signal S16 passing through the BPF 16), $\Delta f$; the (shift) frequency of the frequency signal S18 supplied from the local oscillator 18, and t; time The first term of Equation (1) represents a signal with the frequency of a sum of the frequency f16 and a frequency $\Delta f$, and the second term represents a signal with the frequency of a difference between the frequency f16 and the frequency $\Delta f$. By acquiring the signal of the first term, the frequency f16 of the signal S16 is shifted.

Note that, in this embodiment, if the tone frequency of the tone signal St is set as ft, the frequency shift is carried out so that the tone frequency ft may shift. Let the frequency after the shift of the tone frequency ft be denoted by fts1. Then, the frequency fts1 is preferably set to a frequency higher than a frequency range 0 to 300 Hz, in which the tone signal St exists, so as not to be susceptible to noise or an image signal. Moreover, preferably, an out-of-frequency band component such as noise be sufficiently attenuated by means of the BPF 16.

When the frequency signal S18 is supplied from the local oscillator 18, the frequency shifter 17 multiplies the signal S16 with the frequency signal S18, and then supplies to the BPF 19 the frequency-converted signal S17 obtained by shifting the frequency f16 of the signal S16.

The local oscillator 18 generates the frequency signal S118 for shifting the frequency of the tone signal St contained in the low frequency signal S7 to a predetermined frequency band. The local oscillator 18 includes, for example, a frequency synthesizer, such as a DDS (direct digital synthesizer), a crystal oscillator, and the like.

In this embodiment, the frequency $\Delta f$ is determined based on a difference between the set tone frequency ft and the center frequency fb of the pass band of the BPF 21. For this reason, when the tone frequency of the tone signal St can be selected and set from a plurality of values or even when the tone frequency ft might be changed, the tone signal St can be detected using one BPF 21.

Figure 3:
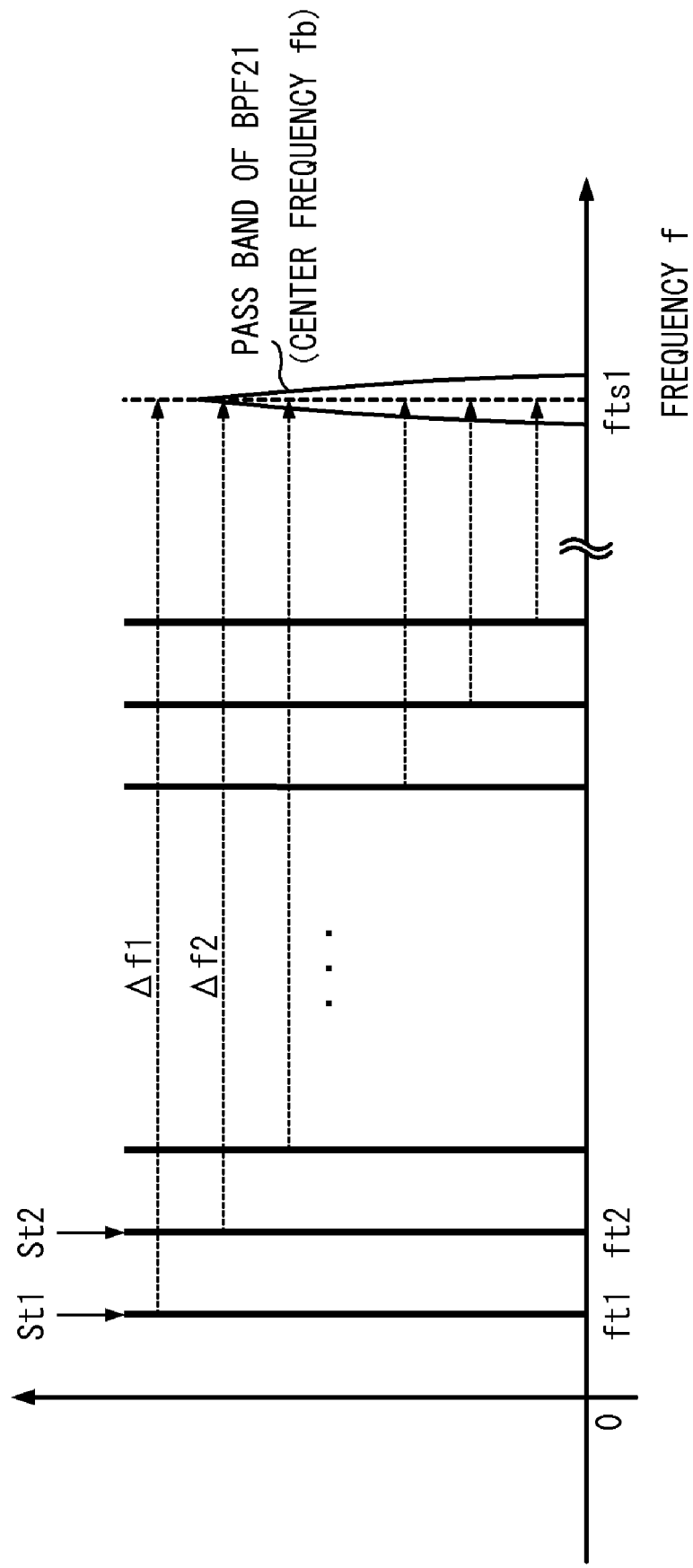
FIG. 3 is a diagram showing a relationship among the frequency of each tone signal, a shift amount, and a shifted frequency.

That is, in detecting the tone signal St with tone frequencies ft1, ft2, . . . as shown in FIG. 3, let $\Delta f$ be a shift frequency (shift amount), then $\Delta f = \Delta f1, \Delta f2, \ldots$ are determined so that a frequency fts1 after the shift may coincide with the center frequency fb of the pass band of the BPF 21.

Figures 4, 5:
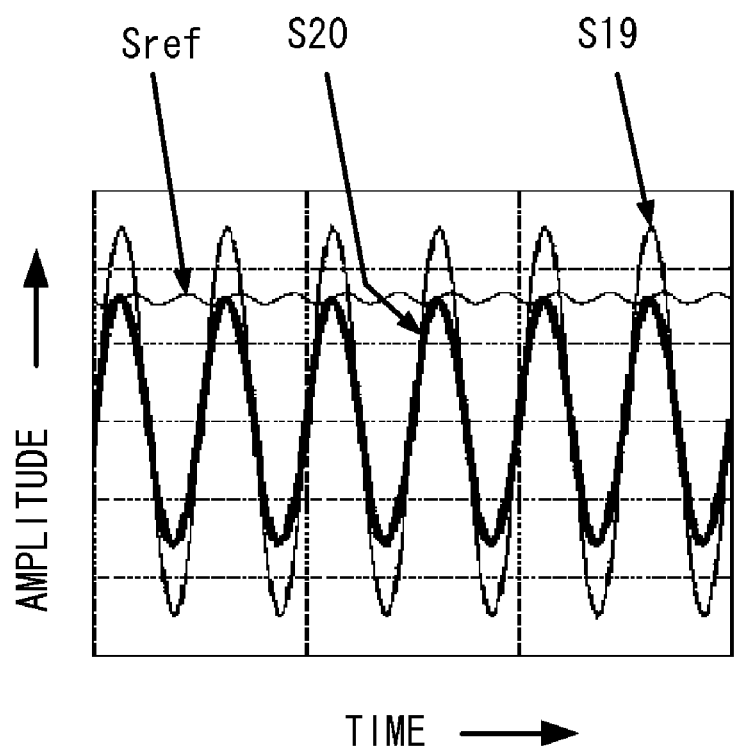
FIG. 4 is a view showing a table illustrating a relationship among the frequency and shift amount of a tone signal, and the center frequency of BPF connected after a normalizer.
FIG. 5 is a waveform chart illustrating waveforms during a normalizing process performed by the normalizer.

When the local oscillator 18 supplies the thus determined shift frequencies $\Delta f1, \Delta f2, \ldots$ to the frequency shifter 17, the frequency shifter 17 will shift the tone frequencies ft1, ft2, . . . of the tone signal St to the frequency fts1. This allows for configuration of one BPF 21. Note that the local oscillator 18 may store the table data of frequencies as shown in FIG. 4.

The BPF 19 is a filter for removing the frequency component of an image signal that is generated by the frequency shifter 17 shifting the frequency. The second term of Equation (1) represents this image signal. The image signal with a frequency (f16-f18) is generated by the frequency shifter 17 shifting the frequency f16 of the signal S16.

The BPF 19 removes this image signal and supplies a signal S19 after the removal to the normalizer 20. Note that, if this process is carried out using complex signals, the BPF 19 is not necessarily required because the image signal will not be generated.

In order to prevent an false detection, the normalizer 20 normalizes and uniformizes the amplitude of the signal S19 supplied from the BPF 19 and generates a normalized signal S20.

For example, as shown in FIG. 5, based on the amplitude of the signal S19 generated by the frequency shifter 17 and supplied from the BPF 19, the normalizer 20 of this embodiment determines a reference value Sref indicative of the strength. Then, the normalizer 20 normalizes the amplitude of the signal S19 by dividing the signal S19 by the reference value Sref, and generates the normalized signal S20.

The amplitude is uniformized by the normalizer 20 performing such a normalizing process, as shown in FIG. 5.

If the amplitude is uniformized in this manner, the amplitude is normalized to an appropriate magnitude even if there is a difference in the amplitude of the tone signal St due to the communication conditions, such as a difference in the output of a radio device on the transmission side or the radio wave environment. Accordingly, the tone signal St is detected reliably and an false detection is prevented. The normalizer 20 supplies the normalized signal S20, which is generated by performing a normalizing process in this manner, to the BPF 21.

The BPF 21 is a filter for filtering the normalized signal S20, which is supplied from the normalizer 20, using the frequency fb as the center frequency.

As described above, the shift frequency $\Delta f$ is determined based on the value ft that is set as the frequency of the tone signal St. Then, the local oscillator 18 supplies the frequency signal S18 of the shift frequency $\Delta f$ to the frequency shifter 17. For this reason, when the frequency of the tone signal St can be selected and set from a plurality of values or even when the tone frequency is to be changed, the receiver 1 may include only one BPF 21 used for strength detection of the tone signal St. The BPF 21 supplies the thus filtered signal tone signal S21 to the signal strength detector 22.

The signal strength detector 22 detects the signal strength S22 of the tone signal St from the signal S21 supplied from the BPF 21. The signal strength detector 22 detects the signal strength S22 of the tone signal St by performing averaging process of absolute values. Note that the signal strength detector 22 may detect the signal strength S22 of the tone signal St by performing arithmetic processing, such as mean-square or sum of squares of I-Q components. The signal strength detector 22 supplies the detected signal strength S22 to the controller 23.

The controller 23 determines the presence or absence of the tone signal St based on the signal strength S22 detected by the signal strength detector 22, and then outputs a control signal S14 (a detection signal or a non-detection signal) based on this determination result to the switch 9. For example, the controller 23 compares the signal strength S22 with a predetermined threshold Sth to determine whether the signal strength S22 is no less than the predetermined threshold Sth or is less than the threshold.

If the signal strength S22 is no less than the threshold Sth, the controller 23 outputs the detection signal to the switch 9. On the other hand, the controller 23 outputs the non-detection signal to the switch 9 if the signal strength S22 is less than the threshold Sth.

Next, for a case where the frequency of the tone signal St is set as ft1, the operation of the receiver 1 according to Embodiment 1 will be described.

Upon receipt of a received signal, the receiver 1 supplies the intermediate frequency signal to the intermediate frequency amplifier 6.

The intermediate frequency amplifier 6 amplifies this intermediate frequency signal, and supplies the amplified signal S6 to the demodulator 7.

The demodulator 7 converts the signal S6 supplied from the intermediate frequency amplifier 6 into the low frequency signal S7, and supplies this to the low-frequency amplifier 8. The low-frequency amplifier 8 amplifies the low frequency signal S7 to generate the signal S8.

Figure 6:
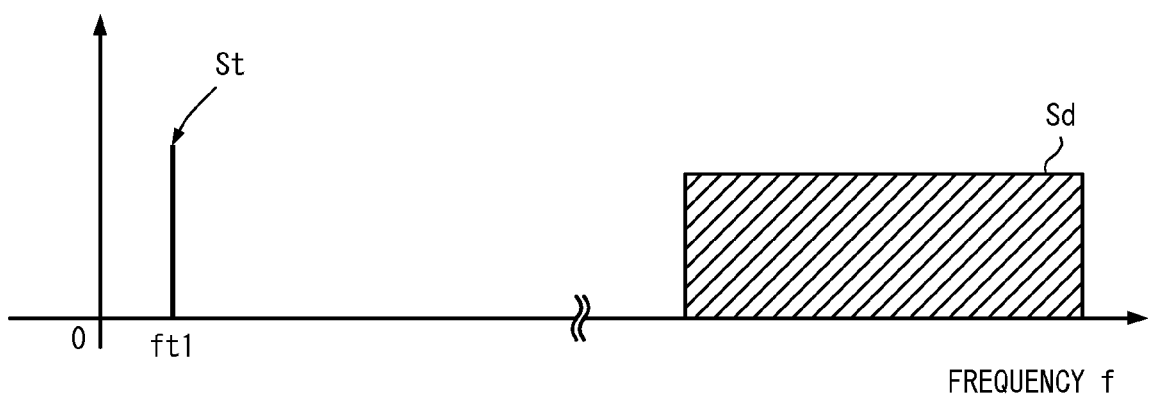
FIG. 6 is a view showing the frequency characteristic of a low frequency signal converted by a demodulator.

Moreover, the low frequency signal S7 converted by the demodulator 7 is supplied also to the LPF 13. The low frequency signal S7 is a sound signal Sd with frequencies 300 Hz to 3000 Hz superimposed by the tone signal St of the frequency ft1, as shown in FIG. 6.

The LPF 13 supplies the signal S13 obtained by suppressing the voice band component of the low frequency signal S7 to the tone signal detector 14. The tone signal detector 14 samples the signal S13 supplied from the LPF 13 at the sampling rate Fs.

Figure 7A:
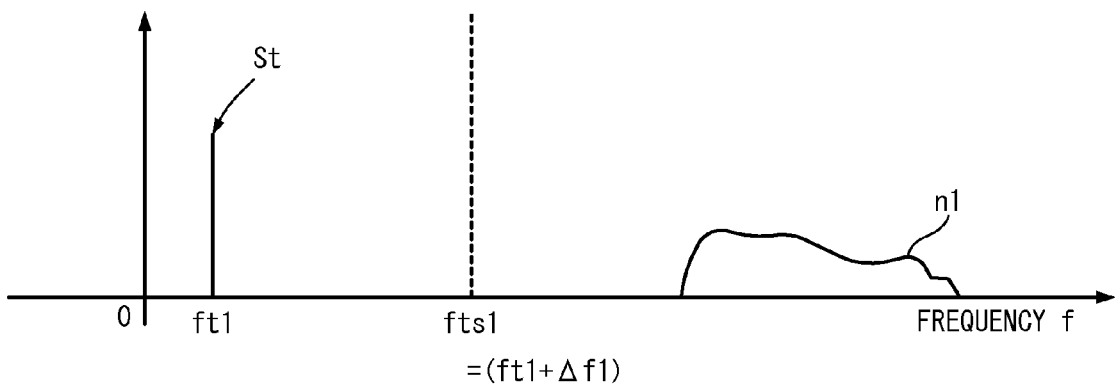
FIG. 7A is a view showing the frequency characteristic of a signal input to a frequency shifter.

The BPF 16 of the tone signal detector 14 further attenuates the voice band component remaining in the signal S13 supplied from the LPF 13 by band-limiting the signal S13 supplied from the LPF 13, as shown in FIG. 7A. Preferably, this voice band component be sufficiently attenuated although remaining as an out-of-frequency band component n1 such as noise.

In detecting the tone signal St of the frequency ft1, the shift frequency $\Delta f1$ is determined based on the tone frequency ft1. The local oscillator 18 generates the frequency signal S18 of the shift frequency $\Delta f1$, and supplies the generated frequency signal S118 to the frequency shifter 17.

Figure 7B:
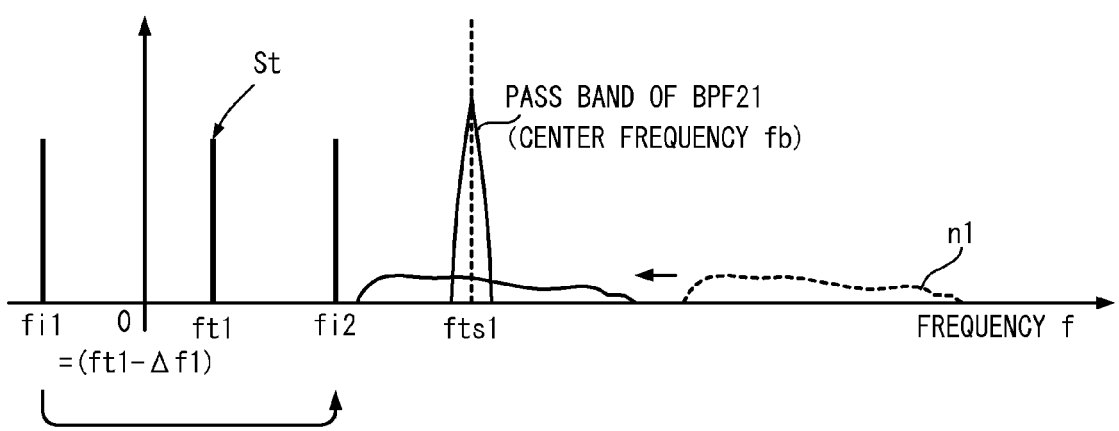
FIG. 7B is a view showing the frequency characteristic of a frequency-converted signal whose frequency has been converted by the frequency shifter.

As shown in FIG. 7B, the frequency shifter 17 shifts the tone frequency ft1 of the tone signal St by the shift frequency Δf1 by multiplying the signal S16 with the frequency signal S18 of the shift frequency Δf1 supplied from the local oscillator 18.

If the frequency shifter 17 shifts the tone frequency ft1 of the tone signal St in this way, the tone frequency ft1 will be shifted to the frequency fts1.

Moreover, if the frequency shifter 17 shifts the tone frequency ft1 by the shift frequency Δf1, an image component will be generated from the component of the tone frequency ft1. Although the frequency of the image component is fi1=ft1−Δf1, it is folded back at 0 Hz, resulting in a frequency fi2=|ft1 −Δf1| as shown in FIG. 7B.

Moreover, as shown in FIG. 7B, although the frequencies of the noise n1 also vary, the noise n1 is sufficiently suppressed by the BPF 16, thus presenting no problem.

The BPF 19 removes the image signal of the frequency fi2 and the noise by band-limiting.

Figure 7C:
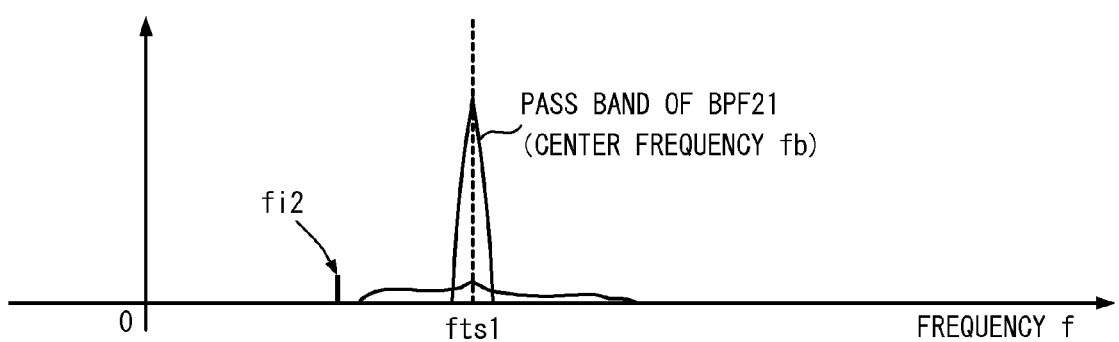
FIG. 7C is a view showing each frequency characteristic of the output signals of BPF that is connected after the frequency shifter.

After the BPF 19 removes the image signal, the frequency characteristics become the characteristics as shown in FIG. 7C and the component of the image frequency fi2 will decrease to such an extent that this component can be neglected.

The normalizer 20 normalizes the strength of the signal, whose image frequency has been removed by the BPF 19, and the BPF 21 extracts the frequency component of the tone signal St. The signal strength detector 22 detects the signal strength S22 of the tone signal St which the BPF 21 extracted.

If the signal strength S22 supplied from the signal strength detector 22 is the predetermined threshold Sth or more, then the controller 23 determines that the tone signal St has been detected, and then supplies a control signal S14 (the detection signal) indicative of this fact to the switch 9.

The switch 9 opens the squelch in accordance with this detection signal. As a result, the signal S8 generated by the low-frequency amplifier 8 is supplied to the HPF 10 through the switch 9.

The HPF 10 cuts off the tone signal St, and supplies the signal S10 composed of the sound signal Sd to the power amplifier 11, and the loudspeaker 12 outputs a sound based on the signal S11 supplied from the power amplifier 11.

In this way, if the frequency of the tone signal St1 is set as ft1 and the receiver 1 receives the tone signal St1 of the tone frequency ft1, the signal strength S22 which the signal strength detector 22 detects is the predetermined threshold Sth or more, and thus the controller 23 determines that the tone signal St has been detected.

However, if the frequency of the tone signal St1 is set as ft1 and the receiver 1 receives the tone signal St of a tone frequency ft2 different from the tone frequency ft1, the frequency obtained by shifting the tone frequency ft2 of the tone signal St by the shift frequency Δf1 is given by ft2+Δf1≠fts1.

Accordingly, the frequency obtained by shifting the tone frequency ft2 by the shift frequency Δf1 differs from the center frequency fb of the BPF 21, and therefore the signal strength S22 which the signal strength detector 22 detects is less than the threshold Sth. Accordingly, the signal strength detector 22 detects that there is no tone signal.

In this way, the frequency shifter 17 shifts the tone frequency ft to the center frequency fb of the BPF 21 by multiplying the signal S16 with the frequency signal S18, whichever value the tone frequency ft of the tone signal St takes. Accordingly, even with one BPF 21, the tone signal St can be detected.

As described above, according to Embodiment 1, the normalizer 20 normalizes the amplitude of the signal S19 that is obtained by removing the image signal from the frequency-converted signal S17 which the frequency shifter 17 generated.

Accordingly, even if the amplitude of the tone signal St is small, the amplitude is unified to an appropriate magnitude by the normalization. As a result, even if there is a difference in the amplitude of the tone signal St due to the communication conditions, the tone signal St can be detected reliably and an false detection can be prevented.

Embodiment 2

In a receiver according to Embodiment 2, the tone signal detector 14 is implemented using software. The tone signal detector 14 of Embodiment 2 carries out normalization by binarizing the amplitude of a signal, wherein in carrying out the normalization, down sampling is performed taking into consideration the processing time and the like.

If the tone signal detector 14 is implemented using computer software, the software needs to be coded taking into consideration the processing time because there is a limitation on the computer throughput.

Figure 8:
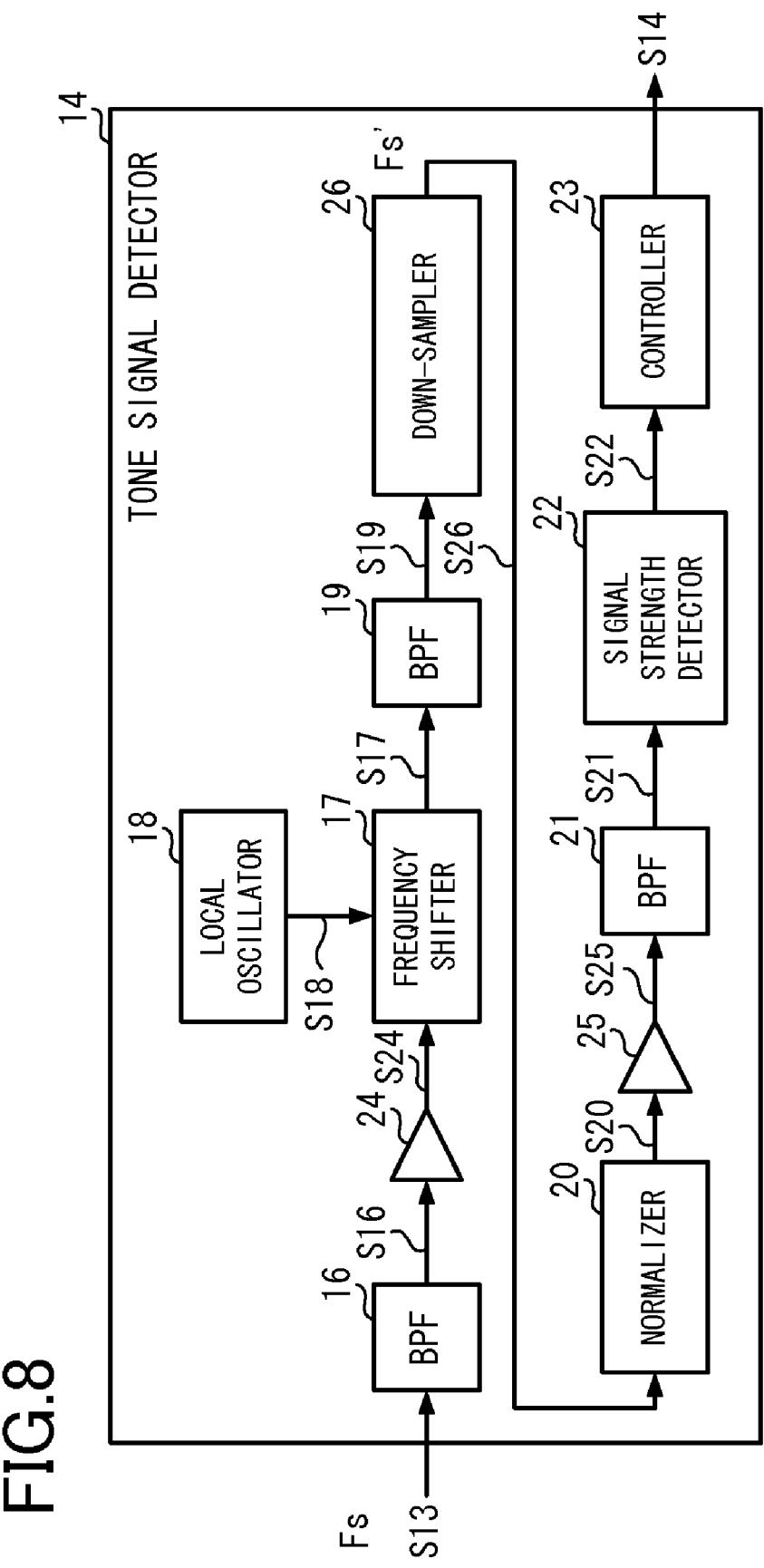
FIG. 8 is a block diagram showing the configuration of a tone signal detector according to Embodiment 2 of the present invention.

For this reason, the tone signal detector 14 according to Embodiment 2 comprises gain adjusters 24, 25 and a down-sampler 26, as shown in FIG. 8.

Note that the tone signal detector 14 samples the signal S13 supplied from the LPF 13 at the sampling rate Fs, as in Embodiment 1.

The gain adjusters 24, 25 perform the gain adjustment of the BPF 16 and the normalizer 20, respectively, to improve the calculation precision.

The down-sampler 26 down-samples the signal S19, which the BPF 19 outputted, at a rate Fs' of 1/N of the sampling rate Fs, and outputs the resultant signal S26 to the normalizer 20.

As the simplest normalizing process, the normalizer 20 of this embodiment normalizes the amplitude of the signal S26 (i.e., the signal obtained by removing the image signal from the frequency-converted signal S17 which the frequency shifter 17 generated), which the down-sampler 26 down-sampled, by binarizing the same.

Figure 9:
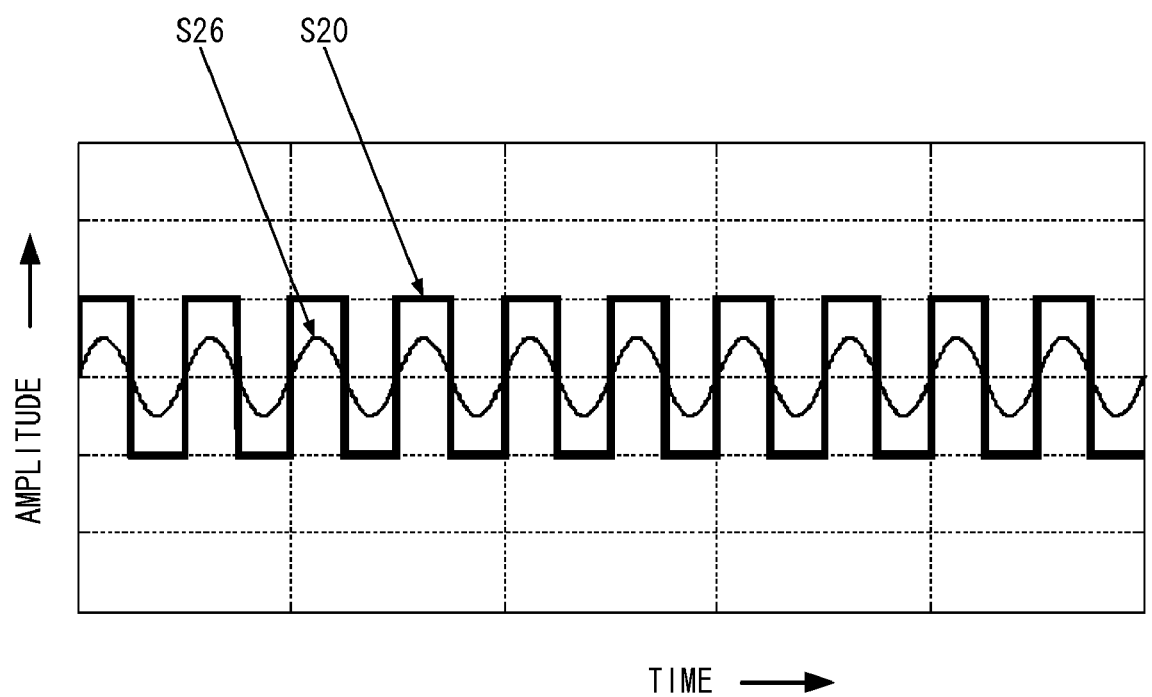
FIG. 9 is a waveform chart showing a signal waveform (Part 1) which the normalizer binarized as a normalizing process.

Because of the binarization performed by the normalizer 20, the normalized signal S20, which the normalizer 20 generates, is a square wave, as shown in FIG. 9.

Note that, in this embodiment, let the center frequency of the BPF 21 be denoted by fb'. Then, the center frequency fb' is set to the frequency fb' centered on a frequency fts1', which is obtained by down-sampling the frequency fts1, the frequency fts1 being obtained by shifting the tone frequency ft1.

Moreover, as described above, since the normalized signal S20 is a square wave, odd-order harmonics will be generated. Preferably, the sampling rate Fs' of the down-sampler 26 and the frequency fts' of the tone signal St after the down sampling be set so that the 3rd-order, 5th-order, 7th-order harmonics having a relatively large strength among these odd-order harmonics may not mix into the BPF 21.

That is, the sampling rate Fs' of the down-sampler 26 and the frequency fts' of the tone signal St after the down sampling are preferably set so that the sampling rate Fs' of the down-sampler 26 may have a frequency different from four times, six times, or eight times the frequency fts' of the tone signal St after the down sampling.

Figure 10A:
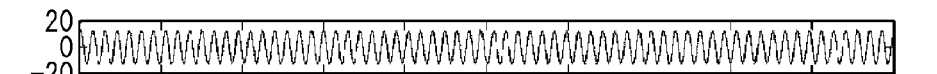
FIG. 10A is a view (Part 1) showing the signal waveform of a signal input to the frequency shifter.

Next, the operation of the receiver 1 according to this embodiment will be described. First, a case is described, in which the signal S16 obtained by removing the noise n1 from the signal S12 by means of the BPF 16 has a waveform as shown in FIG. 10A.

It is assumed that the signal S16 contains the tone signal St of the tone frequency ft1. The gain adjuster 24 adjusts the gain of the signal S16 supplied from the BPF 16, and supplies the gain-adjusted signal S24 to the frequency shifter 17.

As in Embodiment 1, when ft1 is set as the frequency of the tone signal St, the local oscillator 18 will determine the shift frequency Δf based on the tone frequency ft1 and generate the frequency signal S18 of the shift frequency Δf. Then, the local oscillator 18 supplies the generated frequency signal S118 to the frequency shifter 17.

The frequency shifter 17 shifts the tone frequency ft1 of the tone signal St to the frequency fts1 by multiplying the signal S24 supplied from the gain adjuster 24 with the frequency signal S118 of the shift frequency Δf supplied from the local oscillator 18.

Figure 10B:
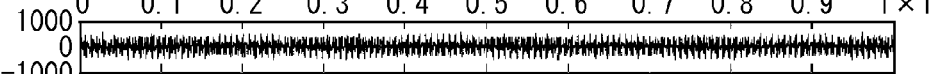
FIG. 10B is a view (Part 1) showing the signal waveform of a frequency-converted signal generated by the frequency shifter.

The frequency shifter 17 shifts the tone frequency ft1 of the tone signal St to the frequency fts1 and thereby the waveform of the frequency-converted signal S17 becomes a waveform as shown in FIG. 10B. The frequency-converted signal S17 contains two components of a frequency (ft1+Δf) and a frequency (ft1−Δf).

Figure 10C:
FIG. 10C is a view (Part 1) showing the signal waveform of a signal obtained by removing an image signal component of the frequency-converted signal.

The BPF 19 removes the signal component of the frequency (ft1−Δf) from the frequency components of the frequency (ft1+Δf) and frequency (ft1−Δf). After the BPF 19 removes the signal component of the frequency (ft1−Δf), the waveform of the signal S19 becomes a waveform as shown in FIG. 10C.

The down-sampler 26 down-samples the signal S19 supplied from the BPF 19 at the sampling rate Fs' of 1/N of the sampling rate Fs.

Figure 10D:
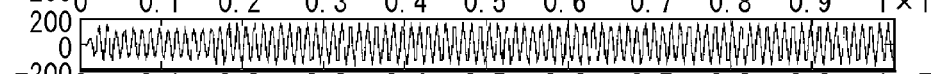
FIG. 10D is a view (Part 1) showing the signal waveform of a signal down-sampled by a down sampler.
Figure 11A:
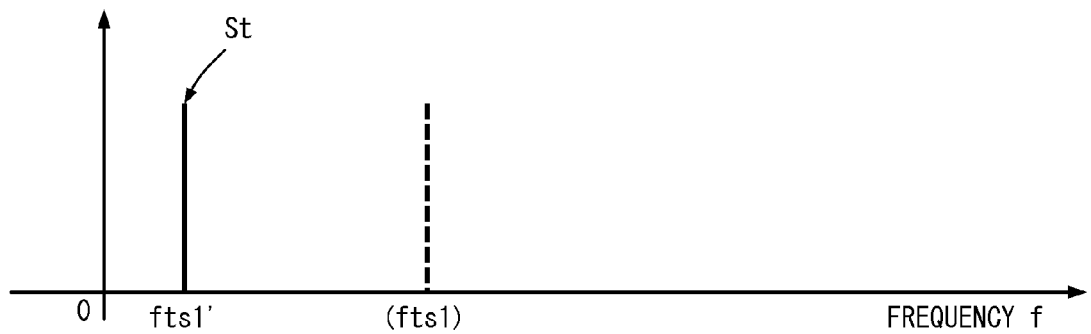
FIG. 11A is a view showing the frequency characteristic of a signal down-sampled by a down-sampler.

As shown in FIG. 11A, the down-sampler 26 performs the down sampling and thereby the tone frequency ft1 of the tone signal St is converted to the frequency fts1', and the waveform of the signal S26 becomes a waveform as shown in FIG. 10D.

Figure 10E:
FIG. 10E is a view (Part 1) showing the signal waveform of a signal binarized by the normalizer.

The normalizer 20 performs a binarizing process on the signal S26 which the down-sampler 26 sampled. As the normalizer 20 performs the binarizing process, the waveform of the signal S26 becomes a square wave as shown in FIG. 10E.

Figure 11B:
FIG. 11B is a view showing the frequency characteristic of a signal binarized by the normalizer.

Moreover, since the normalized signal S20 becomes the square wave, it will contain odd-order harmonics Sh as shown in FIG. 11B.

The frequencies of the harmonics Sh are folded back at Fs'/2 and 0 Hz, and are dispersed into the band. However, if the sampling rate Fs' or the frequency fts' of the tone signal St after the down sampling is set in advance as described above, the effect of the harmonics Sh does not need to be taken into consideration in detecting the tone signal St.

The gain adjuster 25 performs gain adjustment on the normalized signal S20 which the normalizer 20 output, and supplies the gain-adjusted signal S25 to the BPF 21.

Figure 11C:
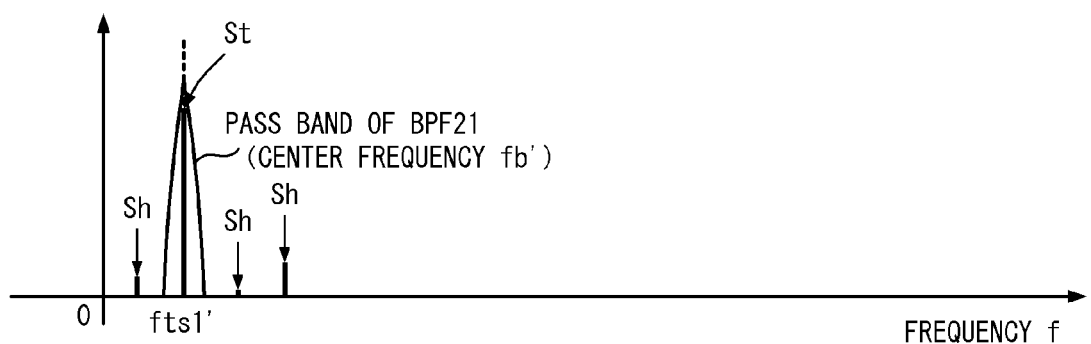
FIG. 11C is a view showing each signal characteristic of a signal filtered by BPF connected after the normalizer via the gain adjuster.

Since the tone signal St of the frequency fts is already received, the frequency fts1' coincides with the center frequency fb' of the BPF 21 as shown in FIG. 11C.

Figure 10F:
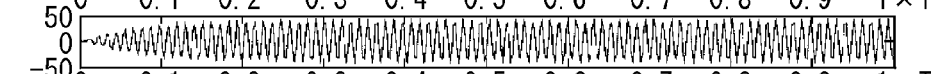
FIG. 10F is a view (Part 1) showing each signal waveform of a signal filtered by BPF connected after a normalizer via a gain adjuster.

Accordingly, as the BPF 21 performs the filtering process on the signal S25, the tone signal St of the frequency fts1' pass through the BPF 21. Accordingly, the signal S21 contains the tone signal St of the frequency fts1' and the waveform of the signal S21 becomes a waveform as shown in FIG. 10F.

The signal strength detector 22 detects the signal strength S22 of the signal S21 by squaring the signal S21 supplied from the BPF 21 and calculating the average thereof, and then outputs this to the controller 23. The controller 23 detects that the signal strength S22 supplied from the signal strength detector 22 exceeds the threshold Sth. Accordingly, the controller 23 determines that the tone signal St has been detected, and then supplies the control signal S14 (the detection signal) indicative of this fact to the switch 9. The switch 9 opens the squelch in accordance with this detection signal.

Figure 12A:
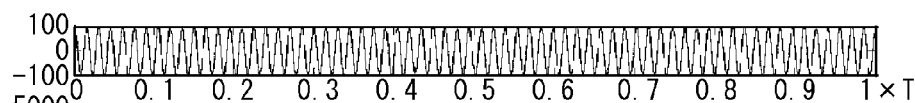
FIG. 12A is a view (Part 2) showing the signal waveform of a signal input to a frequency shifter.

Next, a case will be described, in which the tone signal St of the tone frequency ft1 is contained in the signal S16 and the amplitude of the tone signal St is larger than the waveform shown in FIG. 10A, as shown in FIG. 12A.

When the tone frequency ft1 of the tone signal St is selected, the local oscillator 18 will generate the frequency signal S18 of the shift frequency Δf1, and will supply this to the frequency shifter 17.

The frequency shifter 17 shifts the tone frequency ft1 of the tone signal St to the frequency fts1 by multiplying the signal S24 supplied from the gain adjuster 24 with the frequency signal S18 of the shift frequency Δf supplied from the local oscillator 18.

Figure 12B:
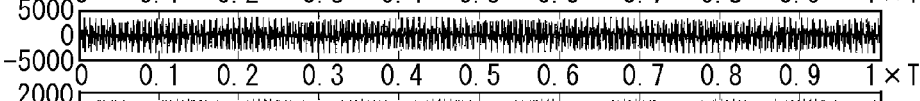
FIG. 12B is a view (Part 2) showing the signal waveform of a frequency-converted signal generated by the frequency shifter.

The frequency shifter 17 shifts the tone frequency ft1 of the tone signal St and thereby the waveform of the frequency-converted signal S17 becomes a waveform as shown in FIG. 12B. The frequency-converted signal S17 contains two components of the frequency (ft1+Δf) and the frequency (ft1−Δf).

Figure 12C:
FIG. 12C is a view (Part 2) showing the signal waveform of a signal obtained by removing an image signal component of the frequency-converted signal.

The BPF 19 removes the signal component of the frequency (ft1−Δf) among the frequency components of frequency (ft1+Δf) and frequency (ft1−Δf). As the BPF 19 removes the signal component of the frequency (ft1−Δf), the waveform of the signal S19 becomes a waveform as shown in FIG. 12C.

Figure 12D:
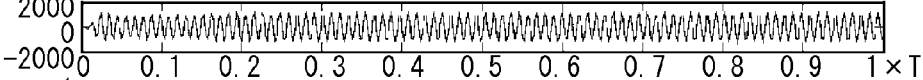
FIG. 12D is a view (Part 2) showing the signal waveform of a signal down-sampled by the down sampler.

The down-sampler 26 down-samples the signal S19 supplied from the BPF 19 at the sampling rate Fs' of 1/N of the sampling rate Fs. When the down-sampler 26 down-samples, the frequency of the tone signal St is converted to fts1' and the waveform of the down-sampled signal S26 becomes a waveform as shown in FIG. 12D.

Figure 12E:
FIG. 12E is a view (Part 2) showing the signal waveform of a signal binarized by the normalizer.

The normalizer 20 performs a binarizing process on the sampled signal S26. The normalizer 20 performs the binarizing process and thereby the waveform of the normalized signal S20 becomes a square wave as shown in FIG. 12E.

Figure 13:
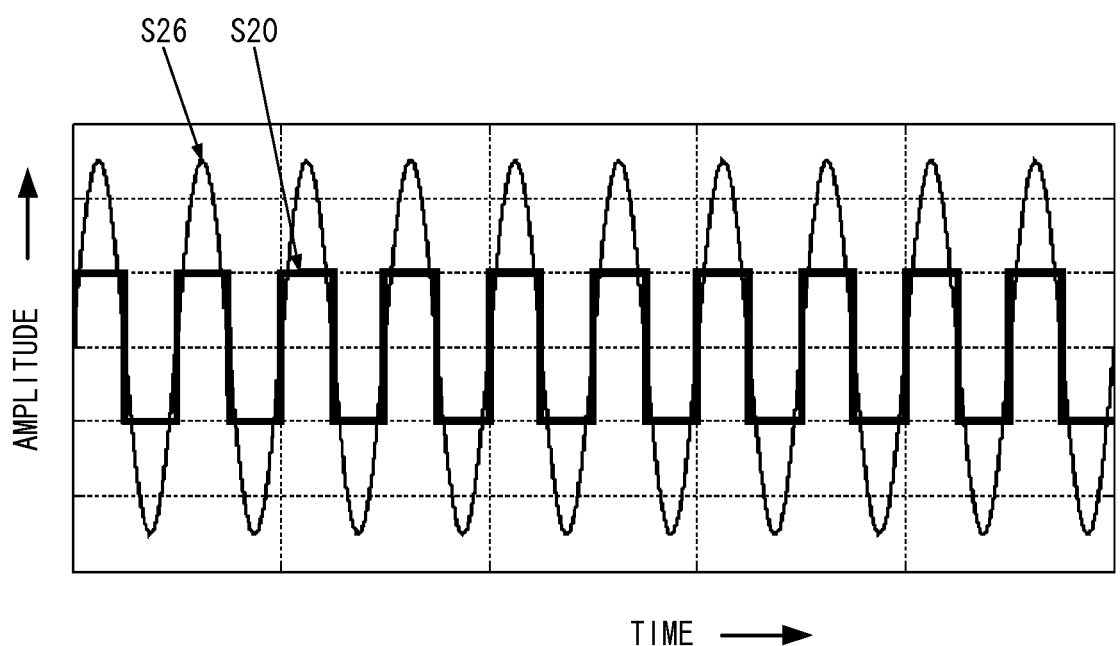
FIG. 13 is a waveform chart showing a signal waveform (Part 2) which the normalizer binarized as the normalizing process.

If the amplitude of the tone signal St is larger than that of the tone signal St shown in FIG. 10A, the amplitude of the signal S26 which the down-sampler 26 down-sampled is comparatively large as shown in FIG. 13.

However, as apparent from the comparison between the normalized signal S20 shown in FIG. 9 and the normalized signal S20 shown in FIG. 13, the amplitude of the normalized signal S20 will not vary even if the amplitude of the tone signal St varies, because the normalizer 20 performs the binarizing process.

If the amplitude of the normalized signal S20 will not vary, the tone signal St can be detected reliably and an false detection can be prevented even if there is a difference in the amplitude of the tone signal St due to the communication conditions, such as a difference in output of the radio device on the transmission side or the radio wave environment.

Figure 12F:
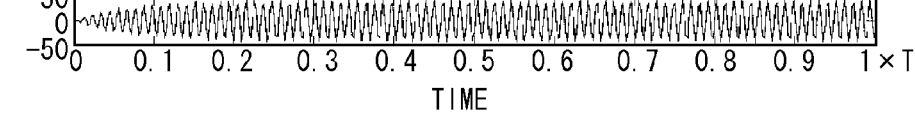
FIG. 12F is a view (Part 2) showing each signal waveform of a signal filtered by BPF connected after the normalizer via the gain adjuster.

As the BPF 21 performs the filtering process on the signal S25, the waveform of the signal S21 becomes a waveform as shown in FIG. 12F. The signal S21 contains the tone signal St of the frequency fts1'.

The signal strength detector 22 detects the signal strength S22 of the signal S21 supplied from the BPF 21, and supplies the detected signal strength S22 to the controller 23. In comparison with the threshold Sth, the signal strength S22 supplied from the signal strength detector 22 exceeds the threshold Sth. Accordingly, the controller 23 determines that the tone signal St has been detected, and then supplies the control signal S14 (the detection signal) indicative of this fact to the switch 9. The switch 9 opens the squelch in accordance with this detection signal.

Figure 14A:
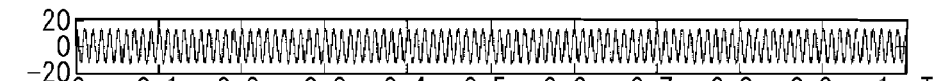
FIG. 14A is a view (Part 3) showing the signal waveform of a signal input to the frequency shifter.

Next, a case will be described, in which the tone signal St of the tone frequency ft2 (ft1≠ft2), not the tone frequency ft1, is contained in the signal S16 and the signal S16 has a waveform as shown in FIG. 14A.

In this case, if the tone frequency ft1 of the tone signal St is selected, the local oscillator 18 will determine a shift frequency Δf=fts1−ft1 based on the tone frequency ft1. Then, the local oscillator 18 generates the frequency signal S118 of the shift frequency Δf, and supplies the generated frequency signal S118 to the frequency shifter 17.

Figure 14B:
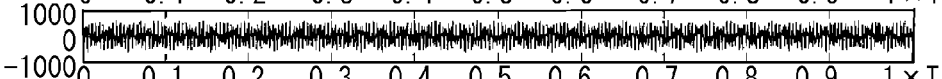
FIG. 14B is a view (Part 3) showing the signal waveform of a frequency-converted signal generated by the frequency shifter.

The frequency shifter 17 shifts the tone frequency ft2 of the tone signal St by multiplying the frequency of the signal S24 supplied from the gain adjuster 24 with the frequency of the shift frequency S18 supplied from the local oscillator 18. The waveform of the shifted frequency-converted signal S17 becomes a waveform as shown in FIG. 14B.

Figure 14C:
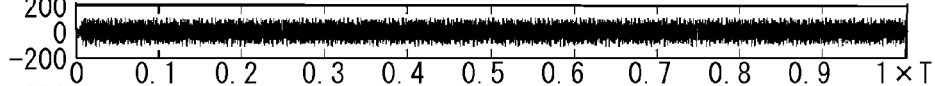
FIG. 14C is a view (Part 3) showing the signal waveform of a signal obtained by removing an image signal component of the frequency-converted signal.

The BPF 19 removes the component of the frequency (ft2−Δf) from the component of the frequency (ft2+Δf) and the component of the frequency (ft2−Δf). If the BPF 19 removes the signal having the component of the frequency (ft2−Δf), the waveform of the signal S19 becomes a waveform as shown in FIG. 14C.

Figure 14D:
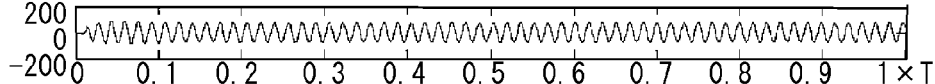
FIG. 14D is a view (Part 3) showing the signal waveform of a signal down-sampled by the down sampler.

The down-sampler 26 down-samples the signal S19 supplied from the BPF 19 at the sampling rate Fs'. The down-sampler 26 performs the down sampling and thereby the tone frequency ft2 of the tone signal St is converted to a frequency fts2' and the waveform of the down-sampled signal S26 becomes a waveform as shown in FIG. 14D.

Figure 14E:
FIG. 14E is a view (Part 3) showing the signal waveform of a signal binarized by the normalizer.

The normalizer 20 performs the binarizing process on the signal S26. The normalizer 20 performs the binarizing process and thereby the waveform of the normalized signal S20 becomes a square wave as shown in FIG. 14E.

The BPF 21 performs a filtering process on the signal S25 supplied from the gain adjuster 25. The tone frequency of the tone signal St contained in the signal S16 is ft2 and differs from the tone frequency ft1 of the tone signal St set in the receiver 1.

Figure 14F:
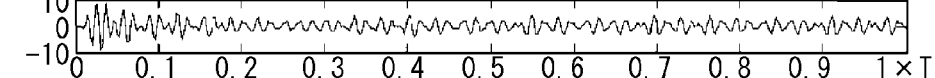
FIG. 14F is a view (Part 3) showing each signal waveform of a signal filtered by the BPF connected after the normalizer via the gain adjuster.

For this reason, the center frequency fb' of the BPF 21 does not correspond with the frequency fts2' and therefore the tone signal St of the frequency fts2' is small. Accordingly, the amplitude of the signal S21 which the BPF 21 outputs is small, and the waveform thereof becomes a waveform as shown in FIG. 14F.

The signal strength detector 22 detects the signal strength S22 of the signal S21 passing thorough the BPF 21, and supplies the detected signal strength S22 to the controller 23. The controller 23 compares the signal strength S22 supplied from the signal strength detector 22 with the threshold Sth. Since the amplitude of the signal S21 is small as shown in FIG. 14F, the signal strength S22 is less than the threshold Sth.

Accordingly, the controller 23 determines that the tone signal St has not been detected, and then supplies the control signal S14 (the non-detection signal) indicative of this fact to the switch 9.

Accordingly, the switch 9 does not open the squelch and thus a sound will not be output from the loudspeaker 12.

In this way, if the tone frequency ft2 of the received tone signal St does not coincide with the tone frequency ft1 set as the frequency of the tone signal St, the tone signal detector 14 will determine that the received signal is not the desired signal.

As described above, in Embodiment 2, the normalizer 20 performs normalization by binarizing the amplitude of the signal S26 which the down-sampler 26 down-sampled.

Accordingly, the tone signal St can be detected by carrying out the processes suitable for the throughput and calculation accuracy of the computer.

Moreover, the binarization allows the normalization of signal S19 with the simplest method, the signal S19 being obtained by removing the image signal from the frequency-converted signal S17.

Embodiment 3

Next, a tone signal detector according to Embodiment 3 of the present invention will be described. A tone signal detector of this embodiment, as with the tone signal detectors of Embodiments 1 and 2 described above, is also included in the receiver 1 (see FIG. 1).

As shown in FIG. 15, the tone signal detector 14 of this embodiment comprises a noise rejection BPF 101, a frequency shifter 102, a local oscillator 103, an image rejection BPF 104, a non-detection period BPF 105, a non-detection period delay unit 106, a detection period BPF 107, a detection period delay unit 108, a filter selector switch 109, a normalizer 110, a signal extraction BPF 111, a signal strength detector 112, and a controller 113.

The tone signal detector 14 of this embodiment is implemented using, for example, a computer system comprising a CPU (Central Processing Unit), a DSP (Digital Signal Processor), or the like.

The noise rejection BPF 101 attenuates the frequency components of the frequencies outside a range of frequencies (e.g., 67 to 250 Hz) that can be taken as the frequency of the tone signal, among the frequency components of the signal S13 supplied from the LPF 13. That is, the noise rejection BPF 101 removes the DC component and the high frequency components due to noise.

The frequency shifter 102 shifts and outputs the frequency of the signal supplied from the noise rejection BPF 101 by mixing the signal supplied from the noise rejection BPF 101 with the local oscillation signal supplied from the local oscillator 103. The frequency shifter 102 shifts the frequency of the signal supplied from the noise rejection BPF 101 so that the frequency of the tone signal to be detected may be processed as an identical frequency even if the frequency of the tone signal is varied. The frequency to shift is determined by the frequency of the local oscillation signal.

The local oscillator 103 generates a local oscillation signal having a frequency of a shift amount of the frequency of the signal that is supplied from the noise rejection BPF 101 to the frequency shifter 102. Here, the frequency of the tone signal contained in the signal after the shift is denoted as a tone frequency ftone (Hz). Hereinafter, a case will be described, in which in the subsequent processes after the image rejection BPF 104, whether or not the tone signal is contained is determined depending on whether or not the frequency component of the tone frequency ftone within the signal has a predetermined signal strength. Note that, the tone frequency ftone is preferably set to such a frequency, e.g., no less than 300 Hz, that may not become a frequency close to the later-described image frequency fimag (Hz).

For example, let the frequency of the tone signal before the shift be denoted as a before-shift frequency fin (Hz) and the frequency of the local oscillation signal be denoted as an oscillation frequency fosc (Hz). Then, each of the frequencies is set so that fosc=ftone<fin may be satisfied. Accordingly, the frequency of the signal output from the frequency shifter 102, i.e., the tone frequency ftone, is given by ftone=fin+fosc. The local oscillator 103 includes, for example, a frequency synthesizer, such as a DDS (direct digital synthesizer), a crystal oscillator, and the like.

The image rejection BPF 104 removes the frequency component of the image frequency fimag (fimag=fosc−fin) from the signal supplied from the frequency shifter 102. When the tone signal is contained in the low frequency signal S7 which the demodulator 7 outputs, the signal supplied from the frequency shifter 102 contains also the frequency component of the image frequency fimag in addition to the frequency component of the tone frequency ftone. For the image rejection BPF 104, a bandpass filter having a filter characteristic capable of removing the frequency component of the image frequency fimag is used.

The non-detection period BPF 105 extracts only the frequency component in the vicinity of the tone frequency ftone from the signal supplied from the image rejection BPF 104. Here, with reference to FIGS. 16 and 17, the filter characteristic of the non-detection period BPF 105 will be described.

Figure 16:
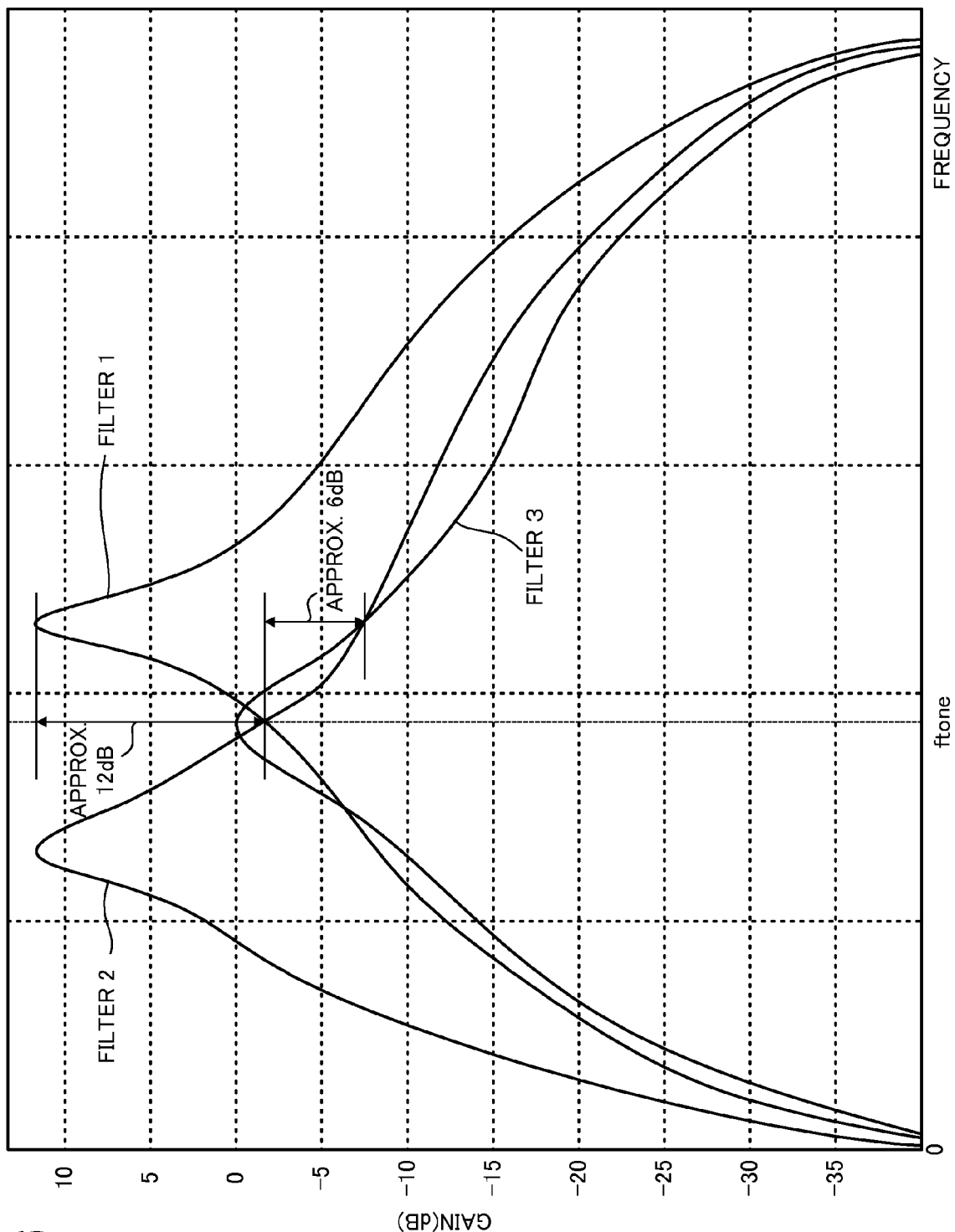
FIG. 16 is a view for illustrating the gain characteristics of a non-detection period BPF and a detection period BPF.

The non-detection period BPF 105 comprises a filter (hereinafter, referred to as a "filter 1") having a transmission characteristic (hereinafter, referred to as a "gain characteristic") denoted as the filter 1 in FIG. 16, and a filter (hereinafter, referred to as a "filter 2") having a gain characteristic denoted as the filter 2 in FIG. 16. In the description below, a case will be described, in which the filter 1 and the filter 2 are connected in series to constitute the non-detection period BPF 105. Moreover, for comparison, the gain characteristic of the detection period BPF 107 is shown as a filter 3 in FIG. 16. As shown in FIG. 16, the filter 1 is a bandpass filter having a peak of gain at a frequency higher than the tone frequency ftone, while the filter 2 is a bandpass filter having a peak of gain at a frequency lower than the tone frequency ftone.

Here, as shown in FIG. 16, a case will be described, in which the filter 1 and the filter 2 have the same gain at the tone frequency ftone. The gain of the filter 1 at the peak of gain of the filter 1 is higher than the gain of the filter 1 at the tone frequency ftone by approximately 12 dB. Then, the gain of the filter 2 at the peak of gain of the filter 1 is lower than the gain of the filter 2 at the tone frequency ftone by approximately 6 dB. Here, since the non-detection period BPF 105 is constructed with the filter 1 and the filter 2 connected in series, the gain of the non-detection period BPF 105 at the peak of gain of the filter 1 is higher than the gain of the non-detection period BPF 105 at the tone frequency ftone by approximately 6 dB (approximately 12 dB-approximately 6 dB).

Figure 17A:
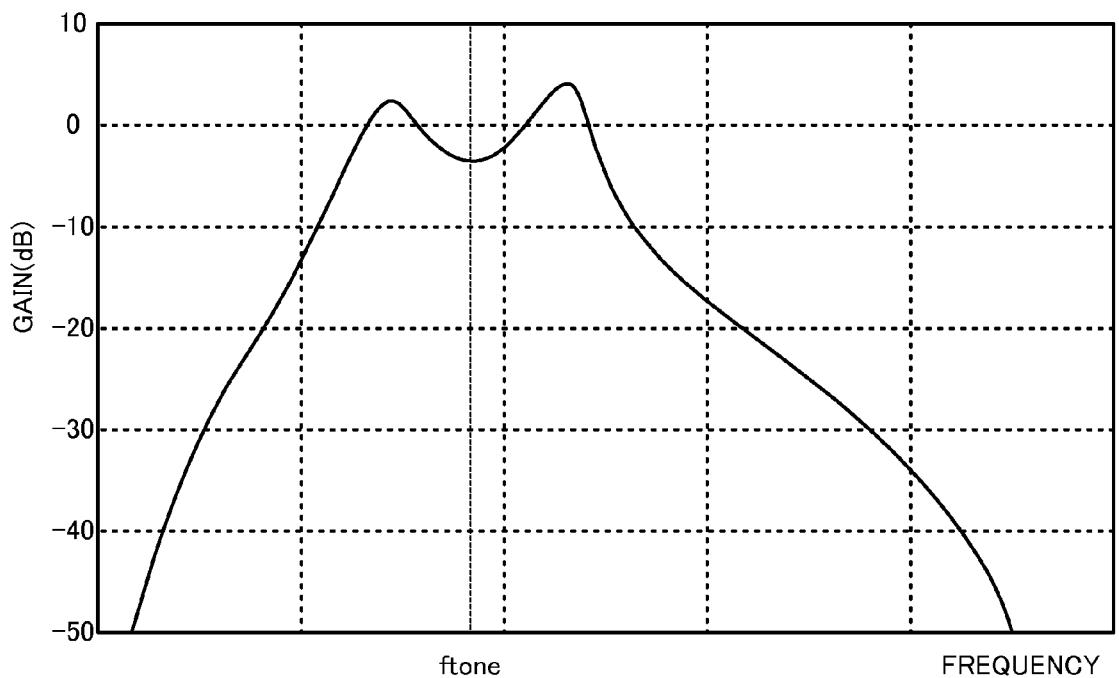
FIG. 17A is a view showing an example of the gain characteristic of the non-detection period BPF.

Similarly, the gain of the non-detection period BPF 105 at the peak of gain of the filter 2 is also higher than the gain of the non-detection period BPF 105 at the tone frequency ftone. In this way, the non-detection period BPF 105 has peaks of gain at a frequency higher and at a frequency lower than the tone frequency ftone. FIG. 17A shows the gain characteristic of the non-detection period BPF 105, i.e., the overall gain characteristic of two filters of the filter 1 and the filter 2.

Figure 17B:
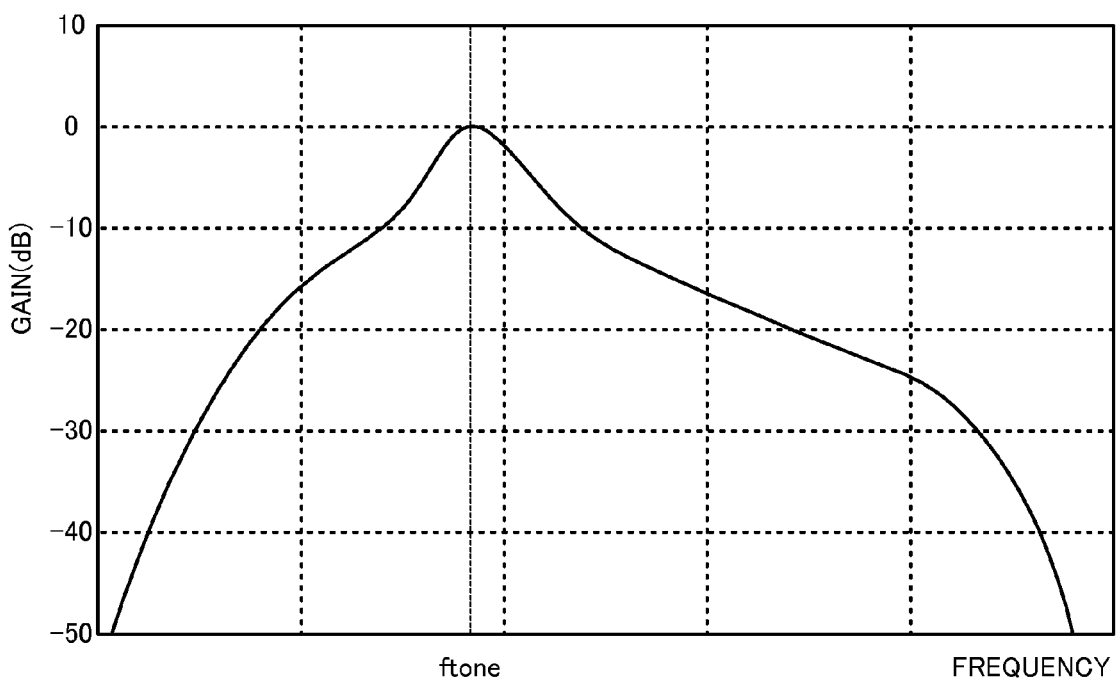
FIG. 17B is a view showing an example of the gain characteristic of the detection period BPF.

The detection period BPF 107 extracts only a frequency component of a frequency close to the tone frequency ftone from the signal supplied from the image rejection BPF 104. FIG. 17B shows the gain characteristic of the detection period BPF 107. As shown in FIG. 17B, the detection period BPF 107 is a bandpass filter having a peak of gain at the tone frequency ftone.

The non-detection period delay unit 106 delays the signal supplied from the non-detection period BPF 105 by a predetermined time, and supplies this delayed signal to the filter selector switch 109. Moreover, the detection period delay unit 108 delays the signal supplied from the detection period BPF 107 by a predetermined time, and supplies this delayed signal to the filter selector switch 109.

The non-detection period delay unit 106 and the detection period delay unit 108 delay the signal supplied thereto, respectively, so that the time until the signal output from the image rejection BPF 104 is supplied to the filter selector switch 109 may be the same in the case where the signal goes through the non-detection period BPF 105 and in the case where the signal goes through the detection period BPF 107.

The non-detection period delay unit 106 and the detection period delay unit 108 make it possible to continuously carry out the detection processing of the tone signal even if the filters are switched over. Note that, if the non-detection period delay unit 106 and the detection period delay unit 108 are implemented using a computer system as in this embodiment, the adjustment becomes easy because the delay time can be adjusted by software.

The filter selector switch 109 supplies either one of the signal supplied from the non-detection period delay unit 106 or the signal supplied from the detection period delay unit 108 to the normalizer 110, based on the control signal S14 supplied from the controller 113. The filter selector switch 109 supplies the signal supplied from the non-detection period delay unit 106 to the normalizer 110 while the non-detection signal is being supplied from the controller 113. On the other hand, the filter selector switch 109 supplies the signal supplied from the detection period delay unit 108 to the normalizer 110 while the detection signal is being supplied from the controller 113.

The normalizer 110 normalizes the signal supplied from the filter selector switch 109. For example, the normalizer 110 acquires the maximum value among a predetermined number (e.g., 100 pieces) of sampling data (absolute values of signal levels) lastly acquired. Then, the normalizer 110 divides the acquired sampling data by this maximum value, and outputs this result.

Figure 18:
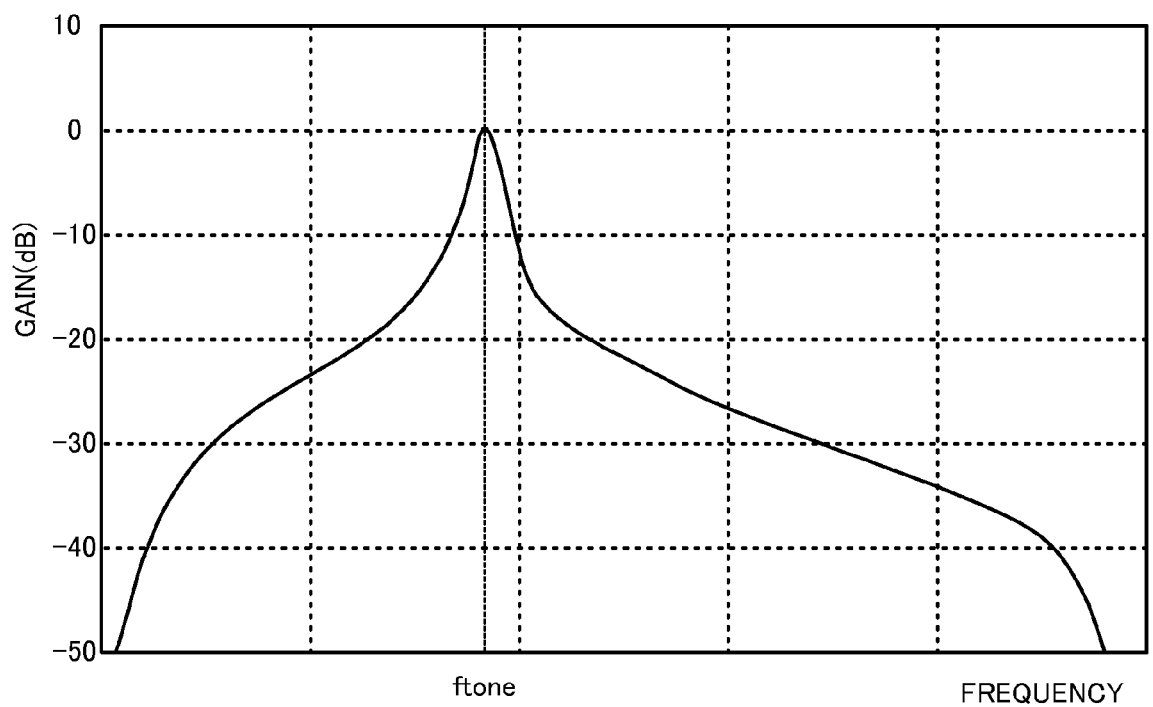
FIG. 18 is a view showing an example of the gain characteristic of a signal extraction BPF.

The signal extraction BPF 111 extracts the frequency component of the tone frequency ftone from the signal supplied from the normalizer 110. The signal extraction BPF 111 is a narrow band BPF having a peak of gain characteristic at the tone frequency ftone, and has a gain characteristic as shown in FIG. 18, for example. As shown in FIGS. 17, 18, the signal extraction BPF 111 is a narrow bandpass filter with a large Q as compared with the detection period BPF 107, and significantly attenuates the frequency components of frequencies other than the tone frequency ftone.

The signal strength detector 112 detects the strength of the signal supplied from the signal extraction BPF 111. The signal strength detector 112 calculates, for example, a moving average of the absolute values of signal levels of the supplied signals, a moving average of squares of signal levels of the supplied signals, a moving average of sums of squares of I-Q components of the supplied signal, or the like as the signal strength.

The controller 113 determines the presence or absence of the tone signal based on the signal strength detected by the signal strength detector 112. For example, the controller 113 determines whether or not the signal strength exceeds a predetermined threshold, and then outputs the detection signal when determining that the relevant signal strength exceeds the predetermined threshold, and outputs the non-detection signal when determining that the relevant signal strength does not exceed the predetermined threshold. The controller 113 supplies the control signal S14 (the detection signal or the non-detection signal) to the switch 9 and the filter selector switch 109.

The switch 9 opens the squelch while the detection signal is being supplied from the controller 113, and closes the squelch while the non-detection signal is being supplied from the controller 113.

Moreover, the filter selector switch 109 supplies the signal supplied from the detection period delay unit 108 to the normalizer 110 while the detection signal is being supplied from the controller 113, and supplies the signal supplied from the non-detection period delay unit 106 to the normalizer 110 while the non-detection signal is being supplied from the controller 113.

In this way, the filter selector switch 109 supplies to the normalizer 110 the signal passing through the filter that differs between when the tone signal is already detected and when it is not detected yet. For this reason, the tone signal detector 14 of this embodiment can detect the tone signal by switching a priority given to reducing the probability of an false detection due to noise and a priority given to reducing the probability to overlook the tone signal, depending on when the tone signal is already detected and when it is not detected yet.

Hereinafter, how the signal output from the image rejection BPF 104 is attenuated will be described in detail with reference to FIG. 19 and FIG. 20. FIGS. 19A to 19D and FIGS. 20A to 20D show the signal level of each frequency component, wherein the horizontal axis represents the frequency (Hz) and the vertical axis represents the signal level.

First, with reference to FIGS. 19A to 19D, how the signal is attenuated when the tone signal is not detected yet (when the tone signal has not been detected yet) will be described. Note that, here, a case is described, in which the tone signal is not contained in the low frequency signal S7, which the demodulator 7 outputs, and the frequency component due to noise exists at the tone frequency ftone.

Figure 19A:
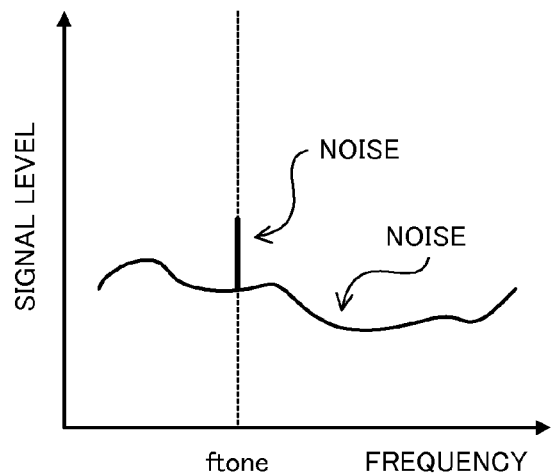
FIGS. 19A to 19D are views for illustrating how a signal is attenuated by each BPF when a tone signal is not detected.

As shown in FIG. 19A, for the signal output from the image rejection BPF 104, while the signal level at the tone frequency ftone has a large value due to noise, the signal levels at other frequencies also have relatively large values due to the noise.

Figure 19B:
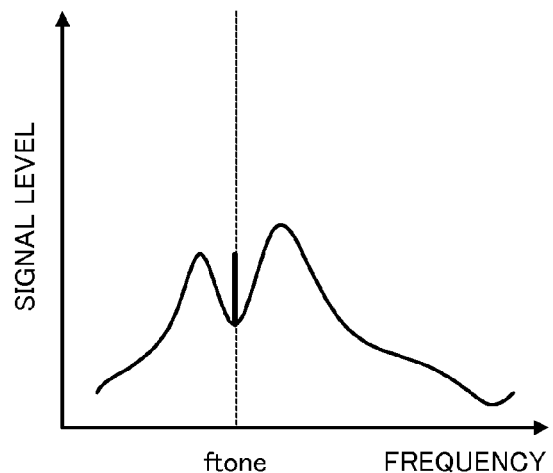

Then, as shown in FIG. 19B, for the signal output from the non-detection period BPF 105, the signal levels at frequencies in the vicinity of the tone frequency ftone become relatively larger than the signal level at the tone frequency ftone. Note that, here, the frequencies in the vicinity of the tone frequency ftone do not include the tone frequency ftone.

Figure 19C:
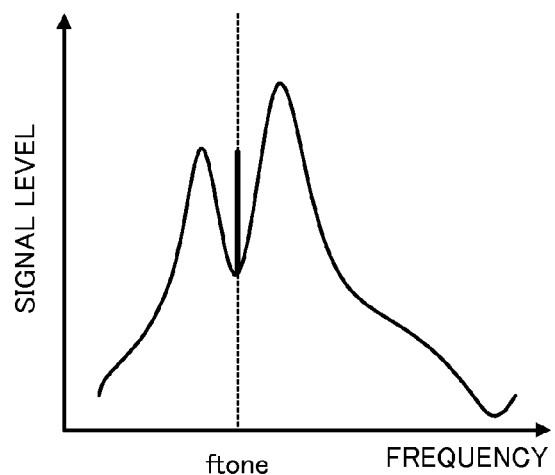

Moreover, as shown in FIG. 19C, for the signal output from the normalizer 110, although the signal level is normalized, the signal level at the frequency in the vicinity of the tone frequency ftone remains relatively larger than the signal level at the tone frequency ftone.

Figure 19D:
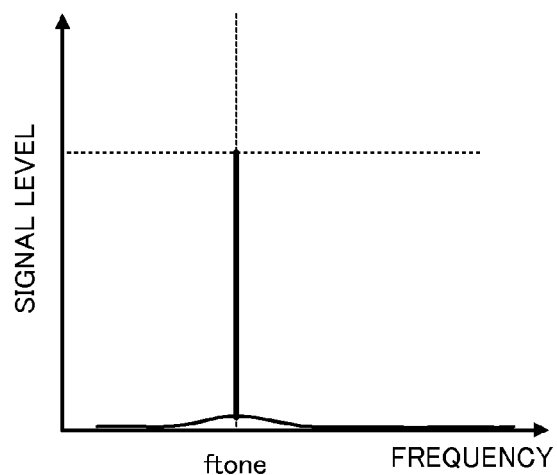

Here, as shown in FIG. 19D, for the signal output from the signal extraction BPF 111, the signal levels at frequencies other than the tone frequency ftone become extremely small. Moreover, although the frequency component of the tone frequency ftone remains, this signal level is not so large. This is because the normalizer 110 carries out normalization so that a signal level at a frequency, the signal level being larger than the signal level at the tone frequency ftone, may become a predetermined value, and therefore, the signal level at the tone frequency ftone becomes relatively small.

In this way, when the tone signal is not detected yet, the signal strength detected by the signal strength detector 112 does not have such a large value even if the frequency component due to noise mixes into the tone frequency ftone. For this reason, the probability that the controller 113 falsely determines the frequency component due to noise as the tone signal can be reduced.

Next, with reference to FIGS. 20A to 20D, how the signal is attenuated when the tone signal is already detected (after the tone signal is detected once) will be described. Note that, here, a case is described, in which the tone signal is contained in the demodulation signal and furthermore the same noise as the one described above is also contained therein.

Figure 20A:
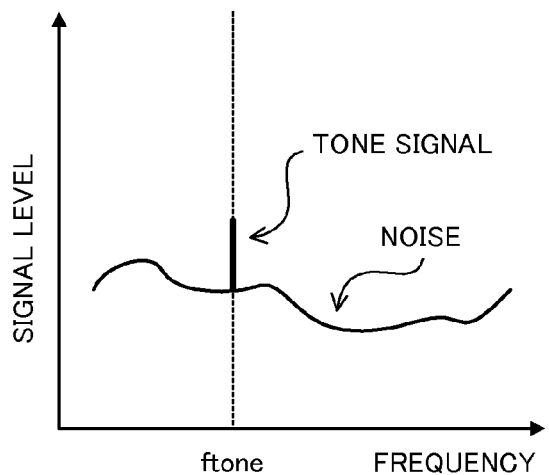
FIGS. 20A to 20D are views for illustrating how a signal is attenuated by each BPF when a tone signal is detected.

As shown in FIG. 20A, for the signal output from the image rejection BPF 104, although the signal level at the tone frequency ftone has a large value due to the tone signal, the signal level at other frequency also has a relatively large value due to the noise.

Figure 20B:
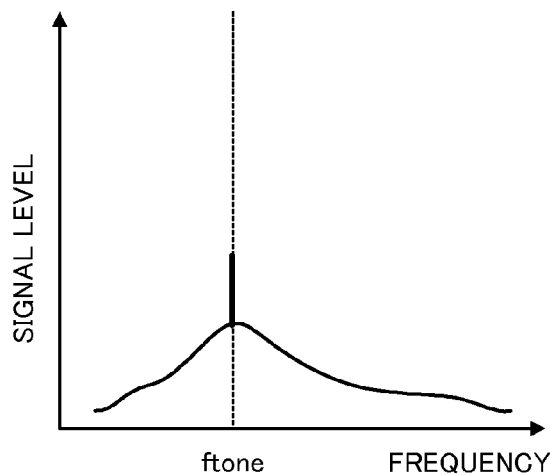

Then, as shown in FIG. 20B, for the signal output from the detection period BPF 107, the signal level at the tone frequency ftone becomes relatively larger than the signal levels at frequencies in the vicinity of the tone frequency ftone.

Figure 20C:
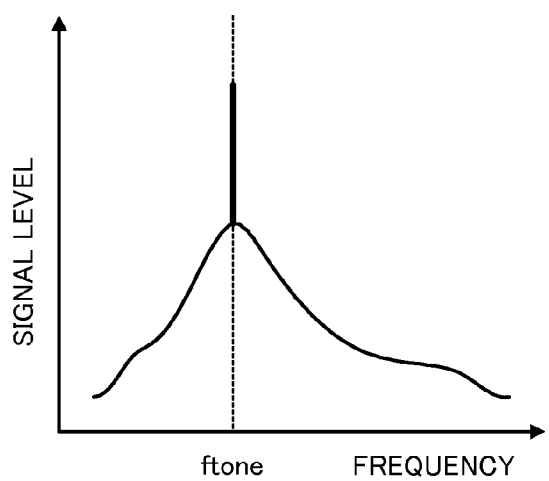

Moreover, as shown in FIG. 20C, for the signal output from the normalizer 110, although the signal level is normalized, the signal level at the tone frequency ftone remains relatively larger than the signal level at the frequency in the vicinity of the tone frequency ftone.

Figure 20D:
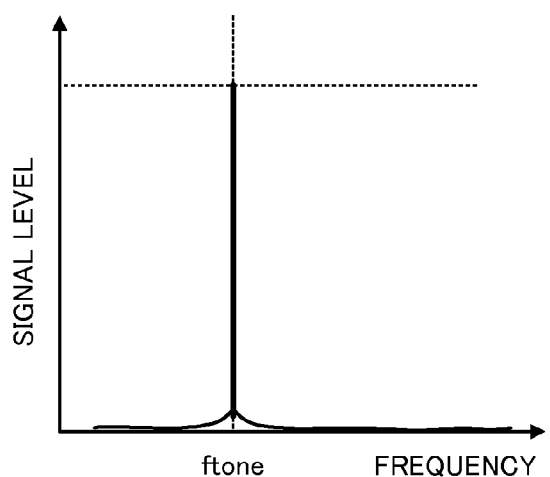

Here, as shown in FIG. 20D, for the signal output from the signal extraction BPF 111, the signal levels at frequencies other than the tone frequency ftone become extremely small. On the other hand, the signal level at the tone frequency ftone becomes large. This is because the normalizer 110 carries out normalization so that the signal level at the tone frequency ftone may become a predetermined value, and therefore, the signal level at the tone frequency ftone becomes relatively large.

In this way, if the tone frequency ftone has a frequency component after the tone signal is detected once, the signal strength detected by the signal strength detector 112 will have a large value. For this reason, after detecting the tone signal once, the tone signal detector 14 of this embodiment can reduce the probability to overlook the tone signal. That is, the receiver 1 of this embodiment can reduce the probability to falsely shut off the squelch after opening the squelch once.

As described above, according to the tone signal detector 14 concerning this embodiment, when the tone signal is not detected yet, the probability of an false detection of the tone signal caused by noise can be reduced, and after the tone signal is detected once, the probability to overlook the tone signal can be reduced. Note that, even before the tone signal is detected, the tone signal can be detected unless the signal level at the frequency in the vicinity of the tone frequency ftone due to noise becomes large. Moreover, even after the tone signal is detected, if there is no tone signal, there is no possibility of false detection unless the signal level at the frequency in the vicinity of the tone frequency ftone becomes large due to noise.

In this way, the tone signal detector 14 concerning this embodiment switches between a filter used when the tone signal is detected and a filter used when the tone signal is not detected. For this reason, until the tone signal is detected, an false detection of the tone signal caused by noise can be reduced, and after the tone signal is detected once, the probability to overlook the tone signal can be reduced.

In the description above, the tone signal detector 14 concerning the above embodiment is implemented using a computer system comprising a CPU, a DSP, or the like, whereby the digital signal (signal S13) supplied from the LPF 13 is processed. However, for the tone signal detector of this embodiment, each constituent element may be implemented using an analog circuit or the like, whereby an analog signal supplied from the LPF 13 may be processed.

In this case, the noise rejection BPF 101, the image rejection BPF 104, the non-detection period BPF 105, the detection period BPF 107, and the signal extraction BPF 111 are composed of filter circuits having, for example, capacitive elements, resistors, and the like. The frequency shifter 102 is formed using a multiplier, for example. The local oscillator 103 includes, for example, an oscillator circuit having a crystal oscillator, and the like. The non-detection period delay unit 106 and the detection period delay unit 108 are formed using a delay circuit, for example. The filter selector switch 109 is composed of a semiconductor switch or a relay, for example. The normalizer 110 is formed using a memory circuit, a comparator circuit, and a divider circuit, for example. The signal strength detector 112 is formed using an integrator circuit, for example. The controller 113 is formed using a comparator circuit, for example.

Note that, in implementing the present invention, various forms can be contemplated, and the present invention is not limited to the above-described Embodiments 1 to 3.

For example, the tone signal detector 14 concerning Embodiment 1 can be also implemented using computer software, not only using hardware.

Moreover, in the description of Embodiment 1, the normalizer 20 normalizes the signal S119, which the BPF 19 outputted, without down sampling. However, also in Embodiment 1, the normalizer 20 may perform the normalizing process after down-sampling as in Embodiment 2.

Moreover, in the description of Embodiment 3, the tone signal detector 14 comprises the noise rejection BPF 101 and the image rejection BPF 104. However, for example, if the demodulation signal (low frequency signal S7) is handled as a complex signal, the tone signal detector may not comprise the noise rejection BPF 101 and the image rejection BPF 104. This is because in such a configuration, even if the frequency is shifted by the frequency shifter 102, the image signal will not be generated.

Moreover, in Embodiment 3, an example has been shown, in which the filter 1 and the filter 2 are connected in series to constitute the non-detection period BPF 105. However, the non-detection period BPF 105 may have any configuration if the gain characteristic as shown in FIG. 17A can be obtained. For example, the filter 1 and the filter 2 may be connected in parallel so that the outputs of the two filters may be added or subtracted using an adder or a subtractor.

Moreover, in Embodiment 3, an example has been shown, in which the normalizer 110 normalizes the signal level of the supplied signal by dividing it by the maximum value of the signal levels in the past. However, the normalizer 110 may perform normalization using other normalization method. For example, the normalizer 110 can normalize the signal level of the supplied signal by dividing it by the signal strength. In this case, the normalizer 110 may be configured to have a function equivalent to that of the signal strength detector 112, or may be configured to supply data to the signal strength detector 112 and cause the signal strength detector 112 to detect the signal strength, and then receive the detected signal strength. Note that the signal strength here is the moving average of absolute values of the signal levels of the supplied signals, for example.

Moreover, in Embodiment 3, the normalizer 110 may normalize the signal level of the supplied signal by binarizing it. The normalizer 110 binarizes the signal level of the supplied signal depending on whether or not it is larger than a predetermined value, e.g., "0". In this case, for example, the normalizer 110 supplies to the signal extraction BPF 111 a signal (hereinafter, referred to as a "square wave") that is generated as having a signal level "−10" when the signal level of the supplied signal has a negative value or a signal that is generated as having a signal level "10" when it has a positive value.

The square wave in this case is a square wave whose fundamental wave is a frequency having the largest signal level among the frequency components of the signal that is supplied from the filter selector switch 109 to the normalizer 110.

Here, for the non-detection period BPF 105 used when the tone signal is not detected, the gain at the frequency in the vicinity of the tone frequency ftone is higher than the gain at the tone frequency ftone. Accordingly, if a frequency component due to noise exists in the frequency region in the vicinity of the tone frequency ftone, the frequency component in the vicinity of the tone frequency ftone becomes the largest in the signal output from the non-detection period BPF 105.

Accordingly, the frequency in the vicinity of the tone frequency ftone becomes the fundamental wave of the square wave. Here, in the square wave, the frequency components other than that of the fundamental wave become small. Accordingly, even if the signal extraction BPF 111 extracts the frequency component of the tone frequency ftone from the square wave, the extracted frequency component becomes small. Accordingly, the signal strength detected by the signal strength detector 112 becomes small, and the probability that the controller 113 falsely detects the frequency component due to noise as the tone signal can be reduced.

On the other hand, for the detection period BPF 107 used when the tone signal is detected, the gain at the tone frequency ftone is higher than that at the frequency in the vicinity of the tone frequency ftone. Accordingly, even if the frequency component due to noise exists in the frequency region in the vicinity of the tone frequency ftone, the frequency component of the tone frequency ftone becomes the largest in the signal output from the detection period BPF 107.

Accordingly, the tone frequency ftone becomes the fundamental wave of the square wave. Accordingly, if the signal extraction BPF 111 extracts the frequency component of the tone frequency ftone from the square wave, the extracted frequency component becomes large. Accordingly, the signal strength detected by the signal strength detector 112 will increase, and the probability that the controller 113 overlooks the tone signal can be reduced and the probability to falsely shut off (close) the squelch can be reduced.

Moreover, if the signal level of the supplied signal is normalized by binarization, the configuration of the normalizer 110 can be simplified and the throughput can be reduced as compared with the case where normalization is made by dividing the signal level of the supplied signal by the maximum value of signal levels in the past.

Moreover, in Embodiment 3, the throughput can be reduced by down sampling before carrying out normalization. In this case, in the tone signal detector 14, the down sampler is set between the filter selector switch 109 and the normalizer 110 so that the signal may be supplied from the filter selector switch 109 to the normalizer 110 via the down sampler.

The down sampler down-samples the signal supplied from the filter selector switch 109 at a sampling frequency (hereinafter, referred to as a "down sampling frequency") fds (Hz) that is 1/N of the above-described sampling frequency fs.

Moreover, the signal extraction BPF 111 is configured so as to extract the frequency component of the tone frequency fdtone after down sampling.

Moreover, as the binarization is carried out in the normalizer 110, the square wave output from the normalizer 110 becomes a square wave whose fundamental frequency is the tone frequency fdtone (Hz) after down sampling. Accordingly, the square wave output from the normalizer 110 contains odd-order harmonic components of the tone frequency fdtone after down sampling, and in particular, contains more 3rd, 5th, and 7th harmonic components among these harmonic components. For this reason, the down sampling frequency fds and the tone frequency fdtone after down sampling are set so as to reduce the susceptibility to the 3rd, 5th, and 7th harmonic components as much as possible.

For example, taking into consideration the folding back or the like at the frequency of ½ of the down sampling frequency fds and 0 (Hz), the both frequencies are set so that the tone frequency fdtone after down sampling may not become ¼, ⅙, and ⅛ of the down sampling frequency fds.

Moreover, each of the above-described embodiments has been described assuming that the program is stored in each memory or the like in advance. However, the program to run the above-described processing, the program causing the tone signal detector to be operated as the whole of the apparatus, such as the receiver 1, or as a part thereof, may be stored in a computer readable recording medium. Such a medium includes a flexible disk, CD-ROM (Compact Disk Read-Only Memory), DVD (Digital Versatile Disk), or MO (Magneto Optical Disk) and these may be distributed. Then the program may be installed in another computer to cause the computer to operate as the above-described units or cause the computer to execute the above-described steps.

Furthermore, the program may be stored in a disk unit which a server system on the Internet has, and then, for example, the program may be superimposed over a carrier so as to be downloaded to a computer, for example.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A tone signal detector, comprising:
a frequency-signal generator that generates a frequency signal for shifting a frequency of a tone signal to a predetermined frequency band;
a frequency converter that generates a frequency-converted signal by shifting a frequency of an input signal containing the tone signal by a frequency of the frequency signal generated by the frequency-signal generator;
a normalizer that generates a normalized signal by determining a reference value indicative of an intensity of the frequency-converted signal generated by the frequency converter based on an amplitude of the frequency-converted signal, and then dividing the frequency-converted signal by the reference value and thus normalizing the amplitude of the frequency-converted signal;
a filter whose pass band is set in a frequency band of the tone signal contained in the normalized signal generated by the normalizer, the filter filtering the normalized signal; and
a tone signal detection unit that detects the tone signal based on the signal filtered by the filter.

2. A tone signal detector that detects a tone signal of a predetermined frequency contained in an input signal, comprising:
a signal non-detection period filter;
a signal detection period filter having a gain characteristic different from that of the signal non-detection period filter;
an extractor extracting a frequency component of a frequency corresponding to the tone signal from a supplied signal;
a discriminator that determines whether or not a signal strength of a signal extracted by the extractor exceeds a predetermined value, outputs a non-detection signal when determining that the signal strength of the signal does not exceed the predetermined value, and outputs a detection signal when determining that the signal strength of the signal exceeds the predetermined value; and
a supply unit which, while the non-detection signal is output by the discriminator, supplies to the extractor a signal obtained by an input signal passing through the signal non-detection period filter and which, while the detection signal is output by the discriminator, supplies to the extractor a signal obtained by the input signal passing through the signal detection period filter.

3. The tone signal detector according to claim 2, wherein the signal non-detection period filter has peaks of gain at a frequency higher and at a frequency lower than a frequency of the tone signal, and wherein
the signal detection period filter has a peak of gain at substantially the same frequency as that of the tone signal.

4. The tone signal detector according to claim 3, wherein the signal non-detection period filter includes a combination of a first bandpass filter having a peak of gain at a frequency higher than that of the tone signal and a second bandpass filter having a peak of gain at a frequency lower than that of the tone signal.

5. The tone signal detector according to claim 2, wherein the extractor includes a normalizer that normalizes a signal level of a supplied signal, and normalizes the supplied signal by means of the normalizer and then extracts a frequency component corresponding to the frequency of the tone signal from the normalized signal.

6. The tone signal detector according to claim 5, wherein the normalizer normalizes the signal level of the supplied signal by binarization using a predetermined threshold.

7. The tone signal detector according to claim 5, wherein the normalizer determines a reference value indicative of an intensity of a supplied signal based on a signal level of the supplied signal, and then normalizes the signal level of the supplied signal by dividing the signal level of the supplied signal by the reference value.

8. The tone signal detector according to claim 2, wherein the supply unit further includes a delay unit that makes a delay time of a signal passing through the signal non-detection period filter substantially identical to that of a signal passing through the signal detection period filter.

9. A tone signal detection method, comprising the steps of:
generating a frequency signal for shifting a frequency of a tone signal to a predetermined frequency band;
generating a frequency-converted signal by shifting a frequency of an input signal containing the tone signal by a frequency of the generated frequency signal;
generating a normalized signal by determining a reference value indicative of an intensity of the generated frequency-converted signal based on an amplitude of the frequency-converted signal, and then dividing the frequency-converted signal by the reference value and thus normalizing the amplitude of the frequency-converted signal;
filtering the normalized signal by means of a filter whose pass band is set to a frequency band of the tone signal contained in the generated normalized signal; and
detecting the tone signal based on the signal filtered by the filter.

10. A tone signal detection method executed by a tone signal detector which includes: a signal non-detection period filter; a signal detection period filter having a gain characteristic different from that of the signal non-detection period filter; an extractor; a discriminator; and a supply unit, the method comprising the steps of:

the extractor extracting a frequency component of a frequency corresponding to a tone signal from a supplied signal;

the discriminator determining whether or not a signal strength of the signal extracted by the extractor exceeds a predetermined value, outputting a non-detection signal when determining that the signal strength of the signal does not exceed the predetermined value, and outputting a detection signal when determining that the signal strength of the signal exceeds the predetermined value; and the supply unit supplying to the extractor a signal obtained by an input signal passing through the signal non-detection period filter while a non-detection signal is output by the discriminator, and supplying to the extractor a signal obtained by the input signal passing through the signal detection period filter while a detection signal is output by the discriminator.

11. A computer readable recording medium recording a program for causing a computer to execute procedures for:

generating a frequency signal for shifting a frequency of a tone signal to a predetermined frequency band;

generating a frequency-converted signal by shifting a frequency of an input signal containing the tone signal by a frequency of the generated frequency signal;

generating a normalized signal by determining a reference value indicative of an intensity of the generated frequency-converted signal based on an amplitude of the frequency-converted signal, and then dividing the frequency-converted signal by the reference value and thus normalizing the amplitude of the frequency-converted signal;

filtering the normalized signal by means of a filter whose pass band is set to a frequency band of the tone signal contained in the generated normalized signal; and detecting the tone signal based on the signal filtered by the filter.

12. A computer readable recording medium recording a program for causing a computer to function as:

a signal non-detection period filter;

a signal detection period filter having a gain characteristic different from that of the signal non-detection period filter;

an extractor extracting a frequency component of a frequency corresponding to a tone signal from a supplied signal;

a discriminator determining whether or not a signal strength of a signal extracted by the extractor exceeds a predetermined value, outputting a non-detection signal when determining that the signal strength of the signal does not exceed the predetermined value, and outputting a detection signal when determining that the signal strength of the signal exceeds the predetermined value; and a supply unit supplying to the extractor a signal obtained by an input signal passing through the signal non-detection period filter while the non-detection signal is output by the discriminator, and supplying to the extractor a signal obtained by the input signal passing through the signal detection period filter while the detection signal is output by the discriminator.

13. A tone signal detector, comprising:

a frequency-signal generator that generates a frequency signal for shifting a frequency of a tone signal to a predetermined frequency band;

a frequency converted that generates a frequency-converted signal by shifting a frequency of an input signal containing the tone signal by a frequency of the frequency signal generated by the frequency-signal generator;

a down sampler that down-samples the frequency-converted signal generated by the frequency converter;

a normalizer that generates a normalized signal by normalizing an amplitude of the frequency-converted signal down-sampled by the down sampler;

a filter whose pass band is set in a frequency band of the tone signal contained in the normalized signal generated by the normalizer, the filter filtering the normalized signal; and a tone signal detection unit that detects the tone signal based on the signal filtered by the filter.

14. The tone signal detector according to claim 13, wherein the normalizer normalizes the amplitude of the frequency-converted signal down-sampled by the down sampler by binarizing the amplitude of the frequency-converted signal.

* * * * *